(12) United States Patent
Irwin et al.

(10) Patent No.: US 7,320,294 B2
(45) Date of Patent: Jan. 22, 2008

(54) CAGE AND RACK SYSTEM FOR HOUSING ANIMALS IN CAGES HAVING DIFFERENT WIDTHS

(75) Inventors: Lynn Irwin, Seaford, DE (US); Chinsoo Park, Salisbury, MD (US); Rodney Gerringer, Belcamp, MD (US); Dale Murray, Elkton, MD (US); John Huss, Jarrettsville, MD (US); Neil E. Campbell, Eden, MD (US)

(73) Assignee: Lab Products, Inc., Seaford, DE (US)

( * ) Notice: Subject to any disclaimer, the term of this patent is extended or adjusted under 35 U.S.C. 154(b) by 169 days.

(21) Appl. No.: 10/694,654

(22) Filed: Oct. 27, 2003

(65) Prior Publication Data

US 2005/0205017 A1    Sep. 22, 2005

Related U.S. Application Data

(60) Provisional application No. 60/510,717, filed on Oct. 11, 2003, provisional application No. 60/421,367, filed on Oct. 25, 2002.

(51) Int. Cl.
*A01K 1/02* (2006.01)

(52) U.S. Cl. .................. 119/455; 119/417; 119/418

(58) Field of Classification Search ............. 119/456, 119/454, 453, 455, 416–421, 452, 493
See application file for complete search history.

(56) References Cited

U.S. PATENT DOCUMENTS

| | | | | |
|---|---|---|---|---|
| 4,343,261 A | * | 8/1982 | Thomas ............ | 119/418 |
| 5,044,316 A | * | 9/1991 | Thomas ............ | 119/419 |
| 5,048,459 A | * | 9/1991 | Niki et al. ........ | 119/418 |
| 5,349,923 A | * | 9/1994 | Sheaffer et al. ... | 119/418 |
| 5,823,144 A | * | 10/1998 | Edstrom et al. ... | 119/475 |
| 5,924,384 A | * | 7/1999 | Deitrich et al. ... | 119/419 |
| 5,954,013 A | * | 9/1999 | Gabriel et al. .... | 119/419 |
| 6,158,387 A | * | 12/2000 | Gabriel et al. .... | 119/419 |
| 6,227,146 B1 | * | 5/2001 | Gabriel et al. .... | 119/419 |

(Continued)

FOREIGN PATENT DOCUMENTS

JP    05168362 A * 7/1993

OTHER PUBLICATIONS

International Search Report dated Jun. 27, 2006 in International Application No. PCT/US2003/34121.

*Primary Examiner*—Andrea M. Valenti
(74) *Attorney, Agent, or Firm*—Stroock & Stroock & Lavan LLP

(57) ABSTRACT

A ventilated cage and rack system. An embodiment of the invention may comprise a ventilated rack, the rack including at least one air exhaust plenum and at least one canopy disposed within the rack, the canopy being adapted to position a cage assembly below the canopy while maintaining a gap between the top of the cage assembly so as to permit air to be drawn into the air exhaust plenum from the interior of the cage assembly through the top of the cage assembly and to also permit ambient air to be drawn across the top of the cage assembly into the air exhaust plenum. The cage assembly comprises one of a first cage having a first width and a plurality of second cages having a second width, the second width being less than the first width.

36 Claims, 23 Drawing Sheets

U.S. PATENT DOCUMENTS

| | | | |
|---|---|---|---|
| 6,336,427 B1 * | 1/2002 | Gabriel et al. | 119/475 |
| 6,543,387 B1 * | 4/2003 | Stein | 119/419 |
| 6,588,371 B2 * | 7/2003 | Hallock et al. | 119/248 |
| 6,729,266 B1 * | 5/2004 | Gabriel et al. | 119/419 |
| 7,036,457 B2 * | 5/2006 | Uchiyama et al. | 119/419 |

* cited by examiner

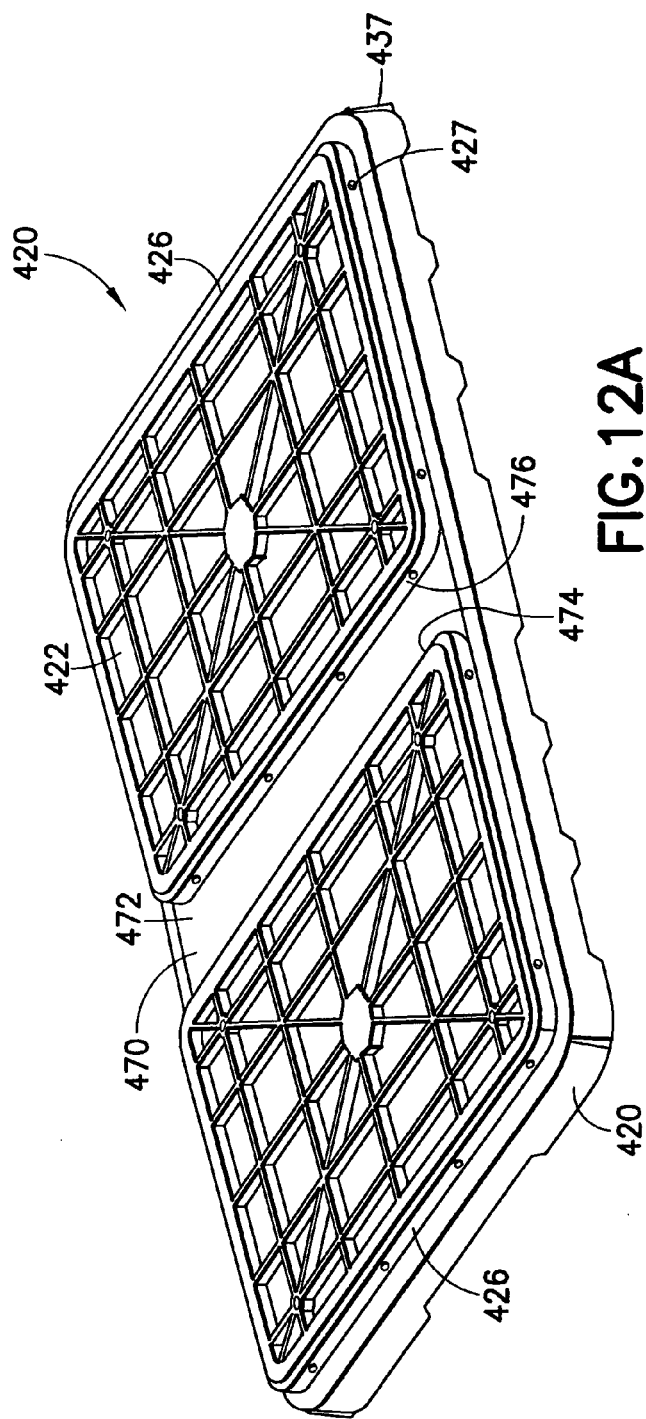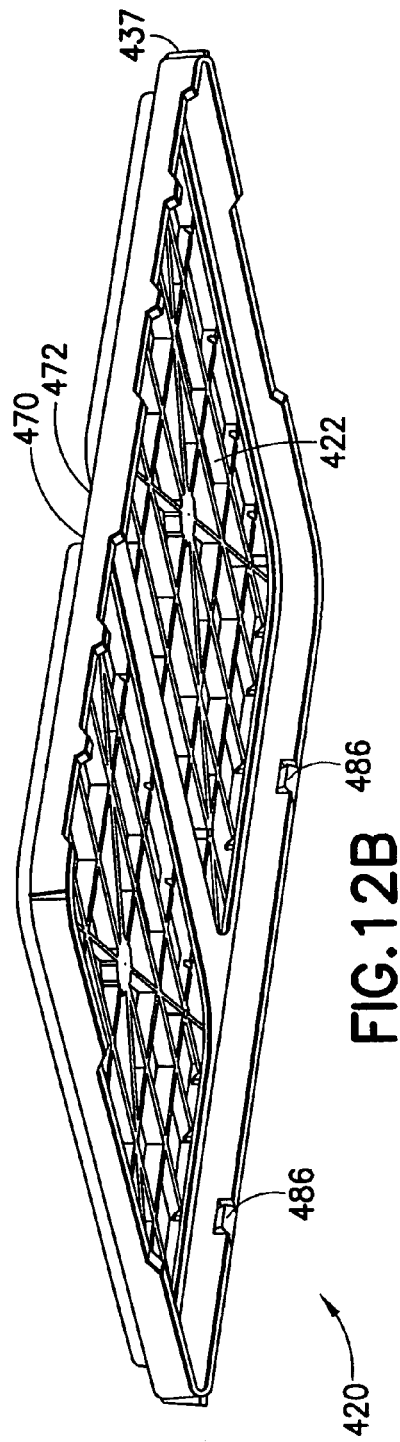
FIG.12A
FIG.12B

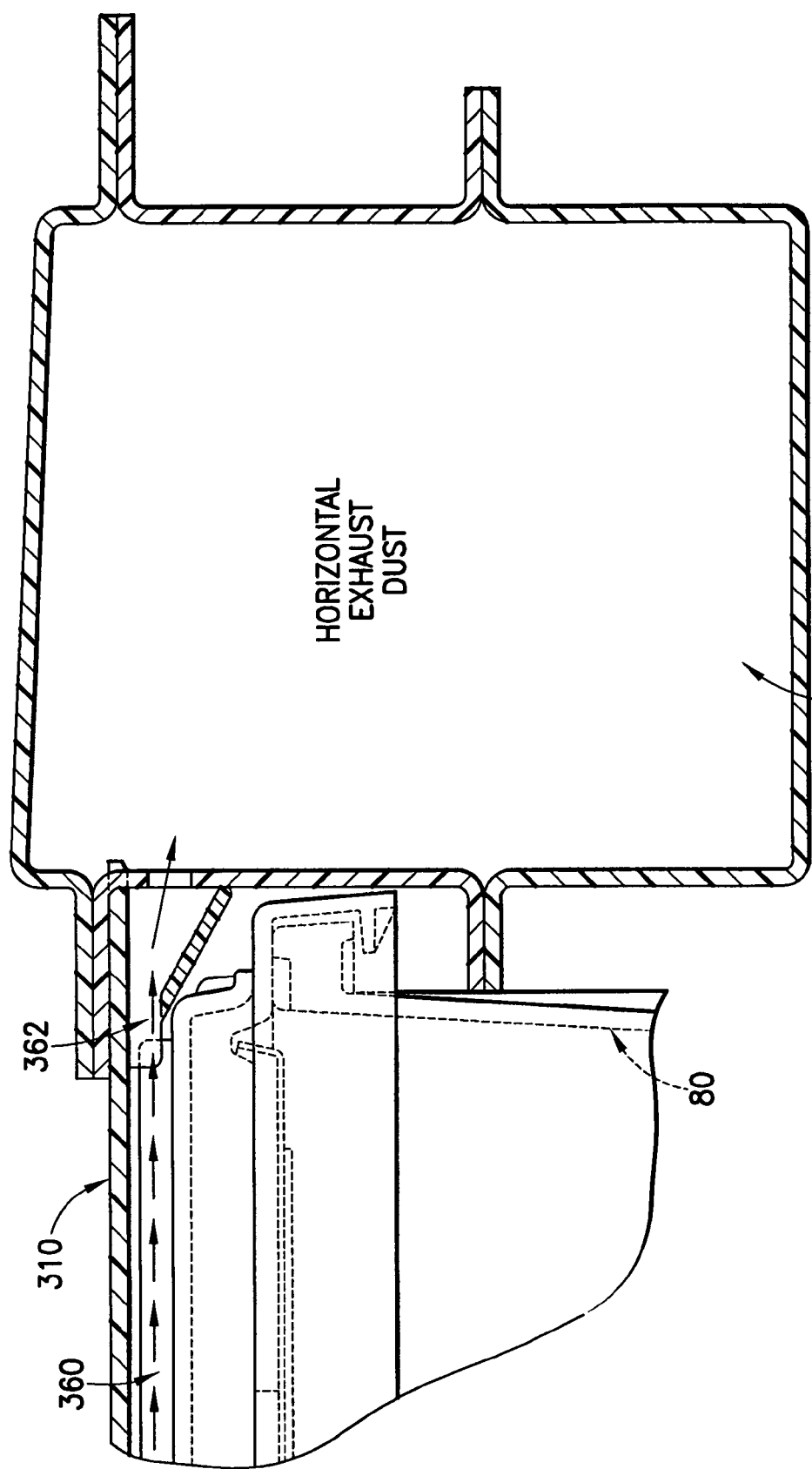

US 7,320,294 B2

CAGE AND RACK SYSTEM FOR HOUSING ANIMALS IN CAGES HAVING DIFFERENT WIDTHS

CROSS-REFERENCE TO RELATED APPLICATIONS

This application claims the benefit of U.S. Provisional Patent Application No. 60/421,367, filed Oct. 25, 2002, entitled Cage and Rack System for Housing Animals in Cages Having Different Widths, and U.S. Provisional Patent Application No. 60/510,717 filed Oct. 11, 2003, entitled Cage and Rack System for Housing Animals in Cages Having Different Widths, both of which are incorporated by reference herein.

BACKGROUND OF THE INVENTION

1. Field of the Invention

The invention relates generally to cage and rack systems for housing animals, and more particularly to a ventilated cage and rack system for housing animals.

2. Description of Related Art

It is well known in the art to house laboratory animals, such as mice and rats, in cages. It is also well known in the art to house the cages on racks. These cages are typically ventilated and, when placed in a rack, environmentally controlled (e.g., air-flow and air-exchange rate) by a fan system of the rack. In general, in such ventilated cage and rack systems, the rack fan system provides air under pressure to each of the cages within the rack, and exhausts air from the cages and the rack.

One such ventilated cage and rack system is disclosed in U.S. Pat. No. 6,158,387, assigned to Lab Products, Inc., in which a rack includes an air exhaust plenum and a canopy. The Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween. canopy is capable of supporting a cage within the rack above the canopy, and also positioning another cage below the canopy so as to permit air to be drawn into the air exhaust plenum from the interior of the second cage through the top of the second cage and to also permit ambient air to be drawn across the top of the second cage into the air exhaust plenum. Cages for such systems may be referred to as cage level barrier cages because they provide for a barrier between the interior and exterior of the cage such that contaminants from the interior of the cage do not readily leave the cage, and likewise, contaminants from the exterior of the cage do not readily enter the interior of the cage.

This related ventilated cage and rack system was satisfactory. However, due to the manner in which the cage is positioned within the rack, only a single width of container may be accommodated by the rack.

In some situations, however, personnel may benefit from the use of cages having different widths. This situation may arise when a study is performed using animals of different species or sizes. A larger animal, or different species of animal, may require a larger cage size than another. Additionally, for the purposes of a study, it may be desirable to house a larger number of animals in one cage than in another, consequently requiring different size cages. Furthermore, in some circumstances, a single cage size may be used, with a larger than needed cage being used for containing animals. This strategy, however, typically leads to a waste of valuable space. Additionally, two different racks may be used, each rack accommodating a different size cage, but again, this strategy also tends to lead to the wasting of valuable space. As such, a need exists for an improved ventilated cage and rack system.

SUMMARY OF THE INVENTION

The present invention satisfies this and other needs. Generally, the present invention is directed to a ventilated cage and rack system wherein the rack has canopies that will facilitate placement of, for example, one wide cage, or two narrow cages under each canopy while still maintaining proper air flow into and out of the cages, as well as maintaining proper air flow from the ambient room environment over the top of the cages. By employing the invention, lab personnel may combine both wide and narrow cages within the same rack, thus saving time and space by not having to rely on two separate racks if the use of different sized cages is desired.

An embodiment of the invention may comprise a ventilated cage and rack system having ventilated rack, the rack including at least one air exhaust plenum and at least one canopy disposed within the rack, the canopy being adapted to position a cage assembly below the canopy while maintaining a gap between the top of the cage assembly so as to permit air to be drawn into the air exhaust plenum from the interior of the cage assembly through the top of the cage assembly and to also permit ambient air to be drawn across the top of the cage assembly into the air exhaust plenum. The cage assembly may comprise one of a first cage having a first width and a plurality of second cages having a second width, the second width being less than the first width.

The present invention accordingly comprises the features of construction, combination of elements, arrangement of parts, which will be exemplified in the disclosure herein, and the scope of the present invention will be indicated in the claims.

BRIEF DESCRIPTION OF THE DRAWINGS

In the drawing figures, which are merely illustrative, and wherein like reference characters denote similar elements throughout the several views:

FIGS. 12A and 12B are top and bottom perspective views respectively of a cage top constructed in accordance with an embodiment of the invention;

FIG. 16 is partial side cutaway view of a rack and canopy in accordance with the invention;

DETAILED DESCRIPTION OF EXEMPLARY EMBODIMENTS

Embodiments of the invention are directed to a ventilated cage and rack system wherein the rack has canopies that will facilitate placement of one relatively wide cage, or two relatively narrow cages, under each canopy while still maintaining a beneficial air flow into and out of the cages, as well as maintaining a beneficial air flow from the ambient room environment over the top of the cages.

Figure 1:
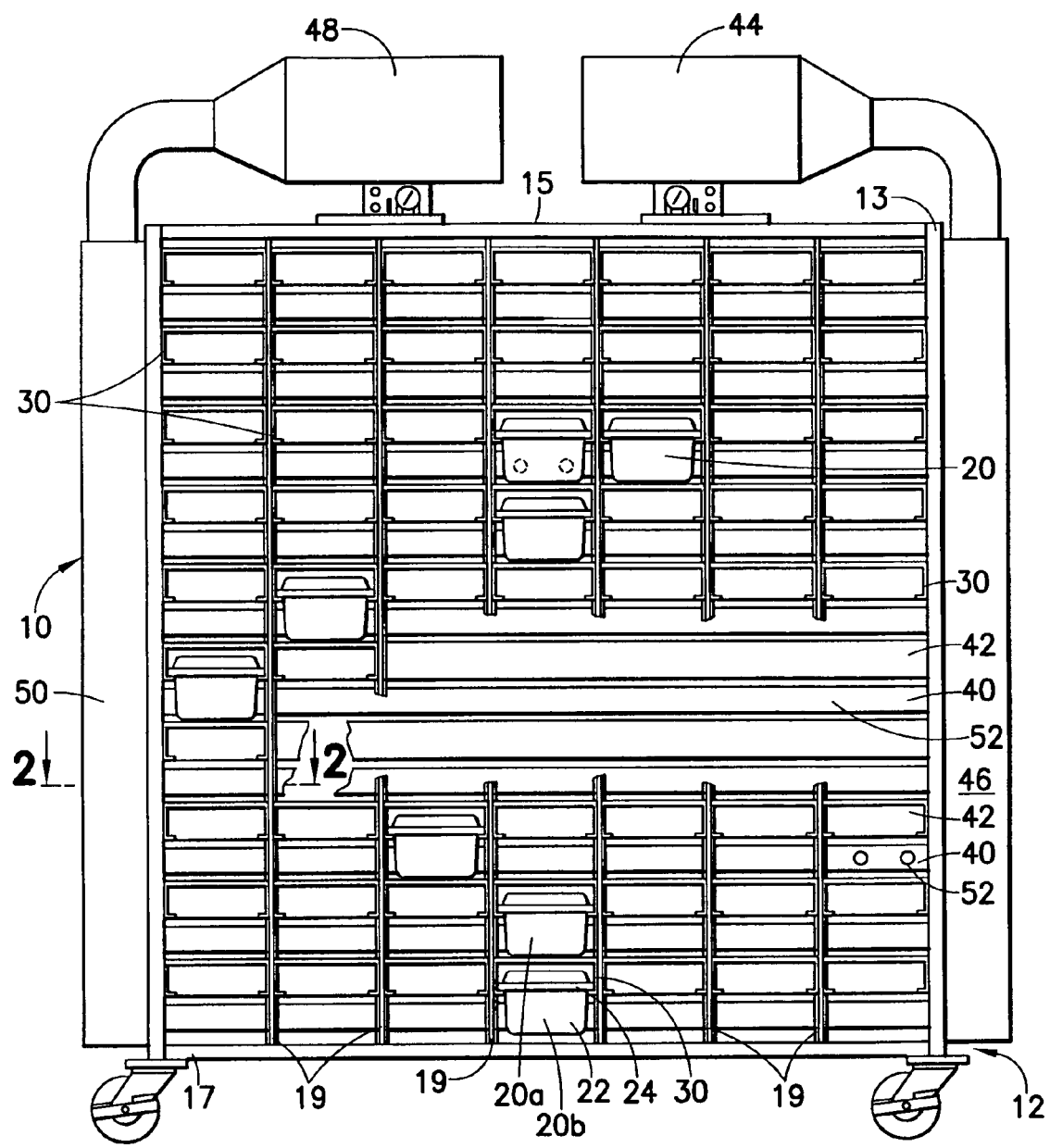
FIG. 1 is a front elevational view, with partial cutaway, of a ventilated cage and rack system constructed in accordance with the present invention.
Figure 2:
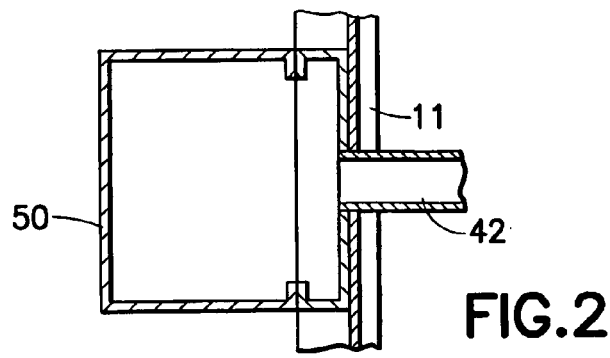
FIG. 2 is a sectional view taken along the line 2-2 of FIG. 1.
Figure 3:
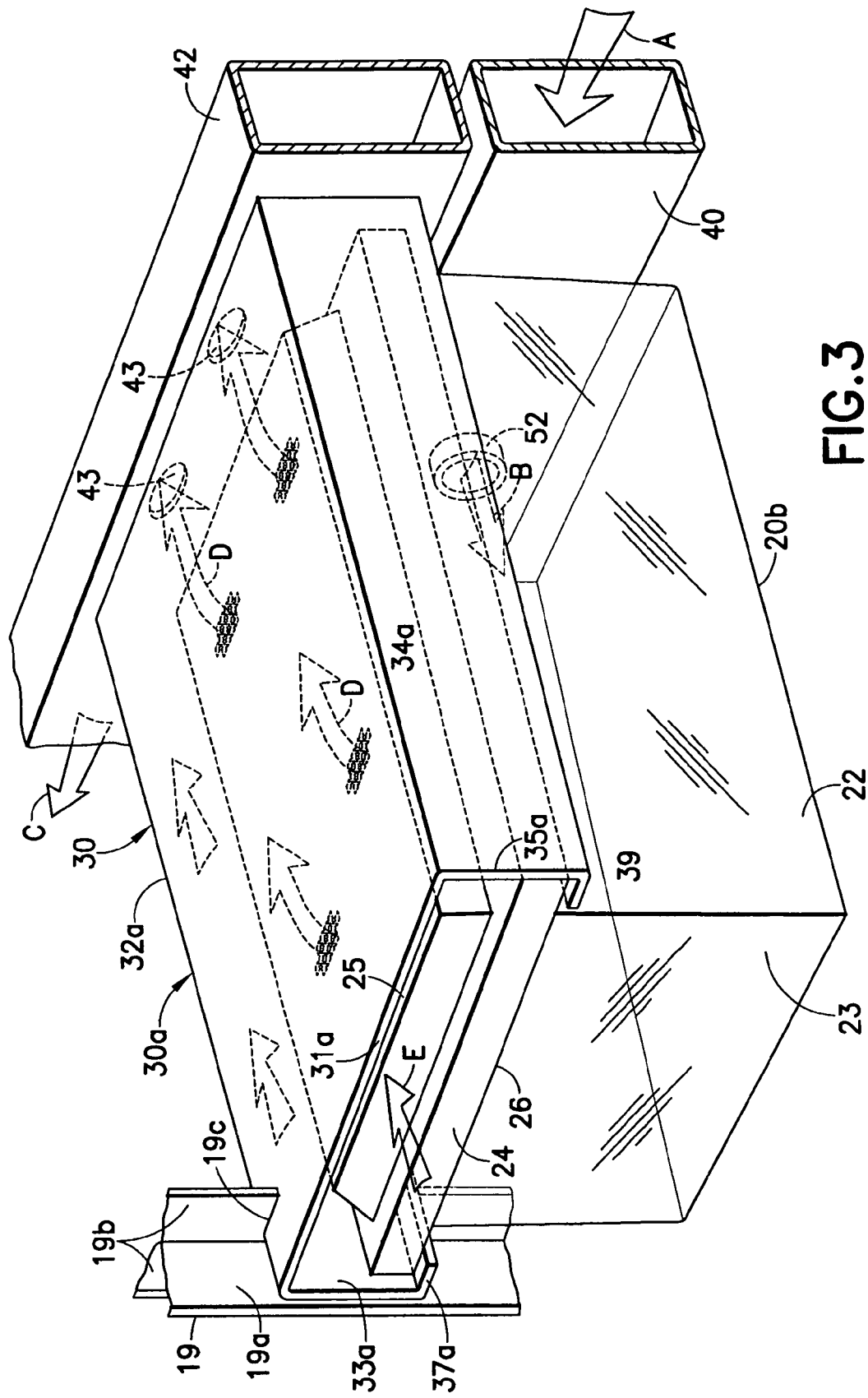
FIG. 3 is a perspective view, partially in phantom, of a cage with a filter cap positioned within a ventilated cage and rack system constructed in accordance with the present invention.

Reference is first made to FIGS. 1-3, wherein a ventilated cage and rack system, generally indicated at 10, constructed in accordance with the invention is shown. Ventilated cage and rack system 10 includes an open rack 12 having a left side wall 11 and a right side wall 13, a top 15, and a bottom 17. A plurality of posts 19 are disposed in parallel between top 15 and bottom 17. Vertical posts 19 are preferably narrow and may comprise walls extending substantially from the front of rack 12 to the rear of rack 12, or may each comprise two vertical members, one at or near the front of rack 12 and the other at or near the rear of rack 12.

Ventilated cage and rack system 10 also includes a plurality of air supply plena 40 and air exhaust plena 42 alternately disposed in parallel between left side wall 11 and right side wall 13 substantially in the rear of rack 12. Air is forced into air supply plena 40 by a blower 44 through an air supply conduit 46, said air supply conduit 46 communicating with each air supply plenum 40 through a side wall of the rack 12. Blower 44 preferably contains an air filter for supplying filtered air to rack 12. Air is withdrawn from air exhaust plena 42 by a vacuum 48 through air exhaust conduit 50, with each air exhaust conduit 50 communicating with each air exhaust plenum 42 through a side wall of the rack 12.

A plurality of cage level barrier cages (cages 20) may be positioned within rack 12. Each cage is formed of a gas impermeable bottom portion 22 having an upstanding sidewall 23 and a filter cap 24. Filter cap 24 may have an overhang 26 which extends over the top end of bottom portion 22. Filter cap 24 is preferably a filter cap as described in more detail below, but may also be a filter cap as known in the art, such as the filter caps disclosed in U.S. Pat. Nos. 4,480,587 and 4,640,228, assigned to Lab Products, Inc.

Cages 20 are positioned within rack 12 by canopies generally indicated at 30. Each canopy 30 shrouds one or more cages 20b below a canopy 30. Accordingly, each canopy 30 is shaped and positioned so as to substantially surround the filter cap 24 of the cage 20b while maintaining a short gap h between a top 25 of filter cap 24 and canopy 30. Gap h should be sufficient to allow movement of gases between canopy 30 and filter cap 24, and in an exemplary embodiment gap h is 3/16 of an inch to 1/4 of an inch. Canopy 30 profiles filter cap 24 and overlaps overhang 26 of filter cap 24, preferably creating a tension fit against the sidewall 23 of bottom portion 22 of cage 20b. The rear of canopy 30 is attached to air exhaust plenum 42.

Canopies 30 are disposed in parallel columns in rack 12 between each pair of adjacent posts 19, or between left side wall 11 and an adjacent post 19, or between right side wall 13 and an adjacent post 19. Each canopy 30 supports a first cage (or first and second cages) 20a above the canopy 30 in the rack 12 and shrouds the filter cap 24 of a second cage 20b below the canopy 30 in the rack 12. The bottom portion 22 of the first cage 20a rests on top of the corresponding canopy 30. Of course, those canopies positioned at the top row of rack 12 do not support a cage 20 above them, and those cages 20 positioned on the bottom row of rack 12 are preferably supported by bottom 17 of rack 12. When positioned in the rack, each cage 20 communicates with air supply plenum 40 through one or more cage couplings 52. Generally, in accordance with the invention, if a relatively wide cage is used, a cage 20 would communicate with two couplings 52. If, however, a relatively narrow cage 20 is used, cage 20 would typically communicate with a single coupling 52. Such cage couplings are known in the art, and are disclosed, for example, in U.S. Pat. Nos. 4,989,545 and 5,042,429 assigned to Lab Products, Inc. Air supply plena 40 may also include means for delivering a supply of water to cages 20 through cage coupling 52, as is also known in the art. Canopies 30 are preferably constructed of a lightweight, transparent material which is substantially rigid, such as clear plastic. Such clear plastic canopies provide enhanced visibility of cages 20 within rack system 10 and reduce the overall weight of rack system 10.

Referring in particular to FIG. 3, a cage 20 is positioned within rack 12 and coupled to the air supply plenum 40 through cage coupling 52. Blower 44 forces air into the air supply plenum 40 in the direction of arrow A, and air is consequently forced into cage 20 through cage coupling 52 in the direction of arrow B to supply air to animals within the cage. Vacuum 48 withdraws air from air exhaust plenum 42 in the direction of arrow C, thereby creating a negative pressure within the air exhaust plenum 42. Ducts 43 are formed in air exhaust plenum 42 below the position at which canopy 30 is attached and communicating with gap h, permitting air below canopy 30 in gap h to be drawn into air exhaust plenum 42 causing a negative pressure within the space defined by canopy 30. Thus, air is drawn from the cage 20 below the canopy 30 through filter top 24 in the direction of arrows D and into the air exhaust plenum 42. Ambient air from the room in which rack 12 is situated is also drawn across the top 25 of filter cap 24 through the open front of canopy 30 in the direction of arrow E (this process is also illustrated in FIG. 16).

Because canopy 30 effectively surrounds filter cap 24 including overhang 26, canopy 30 effectively isolates filter cap 24 from the remainder of the cage 20 which it covers, as well as from the remainder of cages 20 within the rack 12. Accordingly, gases passing from cage 20 around or underneath overhang 26 remain within canopy 30 until removed by air exhaust plenum 42 through ducts 43. Additionally, because overhang 26 is contained within canopy 30 when cage 20 is positioned therein, contamination due to gas exchange between adjacent cages is severely reduced. By providing a ventilated rack and cage system utilizing a negative pressure air exhaust plenum in which air is drawn from a small confined space provided by the canopies 30 and filter tops 24, an open ventilated rack is provided which also provides for personnel protection as well as animal protection.

Referring again to FIG. 3, an embodiment of canopy 30, generally indicated at 30a, comprises a top plate 31a. Top plate 31a extends from the air exhaust plenum 42 above ducts 43 at least the length of filter cap 24 of a cage 20 positioned beneath the canopy 30a, as well as at least to the front end of the bottom portion of a cage 20 positioned above the canopy 30a. Top plate 31a is preferably as long as a cage 20 itself, including filter cap 24. Canopy 30a further comprises a left side plate 33a and a right side plate 35a which each depend substantially perpendicularly from opposite side edges 32a and 34a of top plate 31a. Side plates 33a and 35a are preferably disposed at a distance from each other which is substantially the same as or slightly greater than the width of filter cap 24. Canopy 30a also comprises lips 37a and 39a which each extend perpendicularly from side plates 33a and 35a respectively toward cage 20. Lips 37a and 39a are disposed so as to extend underneath at least a portion of the overhang 26 of filter cap 24. Lips 37a and 39a are substantially parallel to top plate 31a and are each preferably disposed at a distance from top plate 31a which is substantially the same as or slightly greater than the height of filter cap 24 plus gap h. In this manner, any gases escaping from overhang 26 are held in the canopy by lips 37a and 39a and will be drawn away through ducts 43 in air exhaust plenum 42 at the rear of canopy 30a.

Canopy 30a is preferably mounted to air plenum 42 at the rear and to two posts 19 at the front of rack 12. Each post 19 preferably comprises a vertical T-beam, with a first face 19a being disposed substantially parallel to the direction of insertion of a cage 20 into rack 12 (which is parallel to the direction indicated by arrow E), and a second face 19b being disposed substantially perpendicular to said direction of insertion. Each side of face 19b is provided with notches 19c for supporting canopy 30a therein. To maximize horizontal cage density within rack 12, notches 30a preferably extend as close to face 19a as possible, and face 19a of post 19 is preferably made as narrow as possible while still providing structural support for rack 12. By providing such a notched T-beam post 19 on each side of canopy 30a, canopy 30a may be supported on both sides from the front of rack 12. Other means of providing the support of posts 19 are contemplated by the invention. For example, a notched L-beam post 19 could be used, thereby providing support to only one side of canopy 30a from the front of the rack, or canopies 30a could be screwed to a flat vertical panel disposed parallel the cage insertion direction and extending from the top to the bottom of rack 12.

Figure 4:
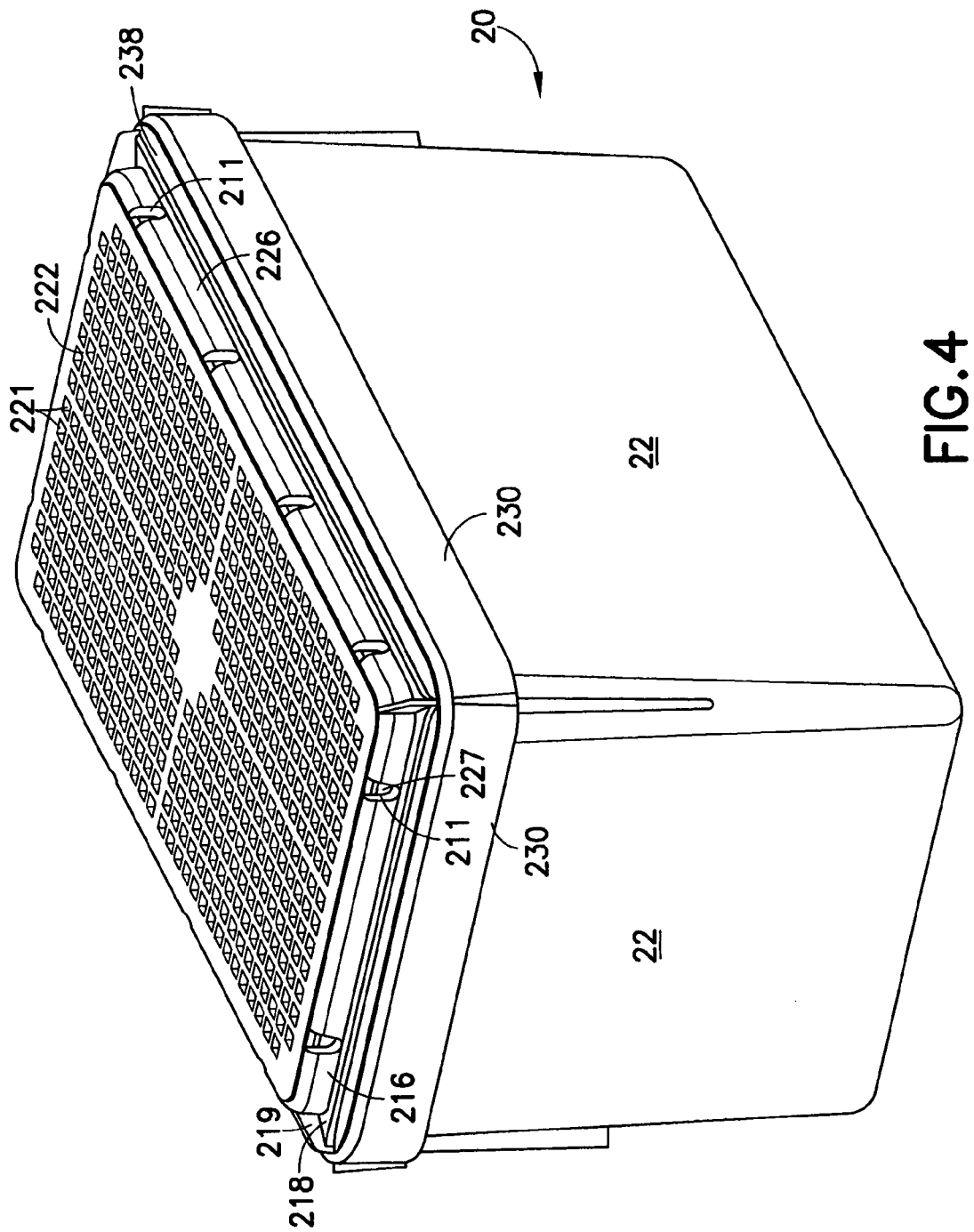
FIG. 4 is a perspective view of the cage constructed in accordance with an embodiment of the invention.
Figure 5:
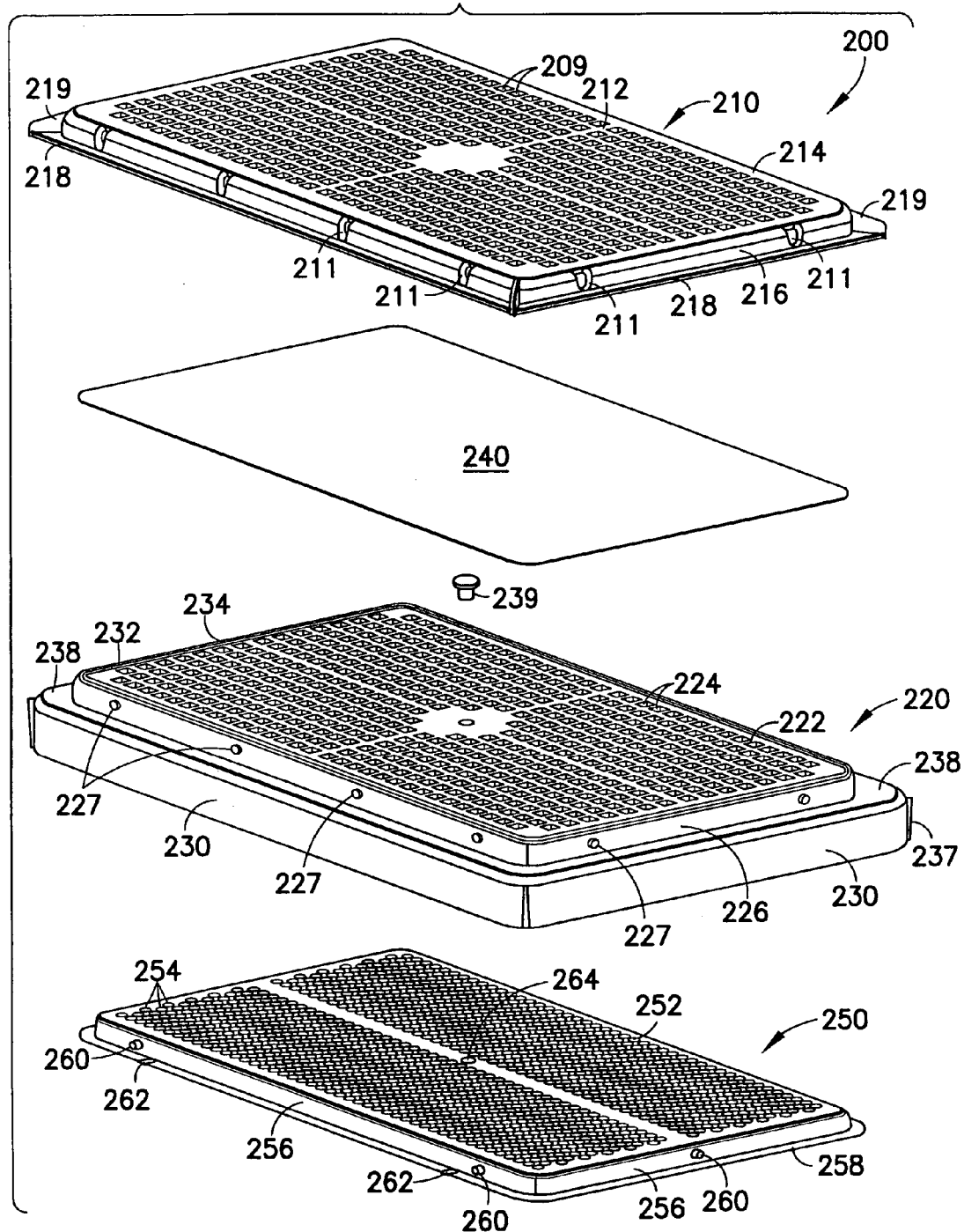
FIG. 5 is an exploded perspective view of the cage constructed in accordance with an embodiment of the invention.

Reference is now made to FIGS. 4 and 5 in which an embodiment of a cage is shown. Specifically cage bonnet 200 includes a retainer 210, a top 220, a filter 240 disposed there between, and a shield 250 affixed to the interior of top 220. Top 220 is again preferably formed of clear plastic which is substantially rigid, but permits a modest degree of flexure when tortional forces are applied thereto. Top 220 has a perforated top wall 222 with perforations 224 forming a grid array. Respective opposed pairs of side walls 226 depend substantially orthogonally from top wall 222. The surface formed on top 220 for resting bonnet 200 on cage bottom 3 includes a continuous lateral peripheral flange 238 extending generally perpendicularly outwardly from side walls 226. A continuous flange 230 depends from lateral peripheral flange 238 to encompass the open top 16 of cage bottom 3. In certain embodiments, a hole 236 is provided through top wall 222 and is dimensioned to receive a rivet 239.

Figure 6:
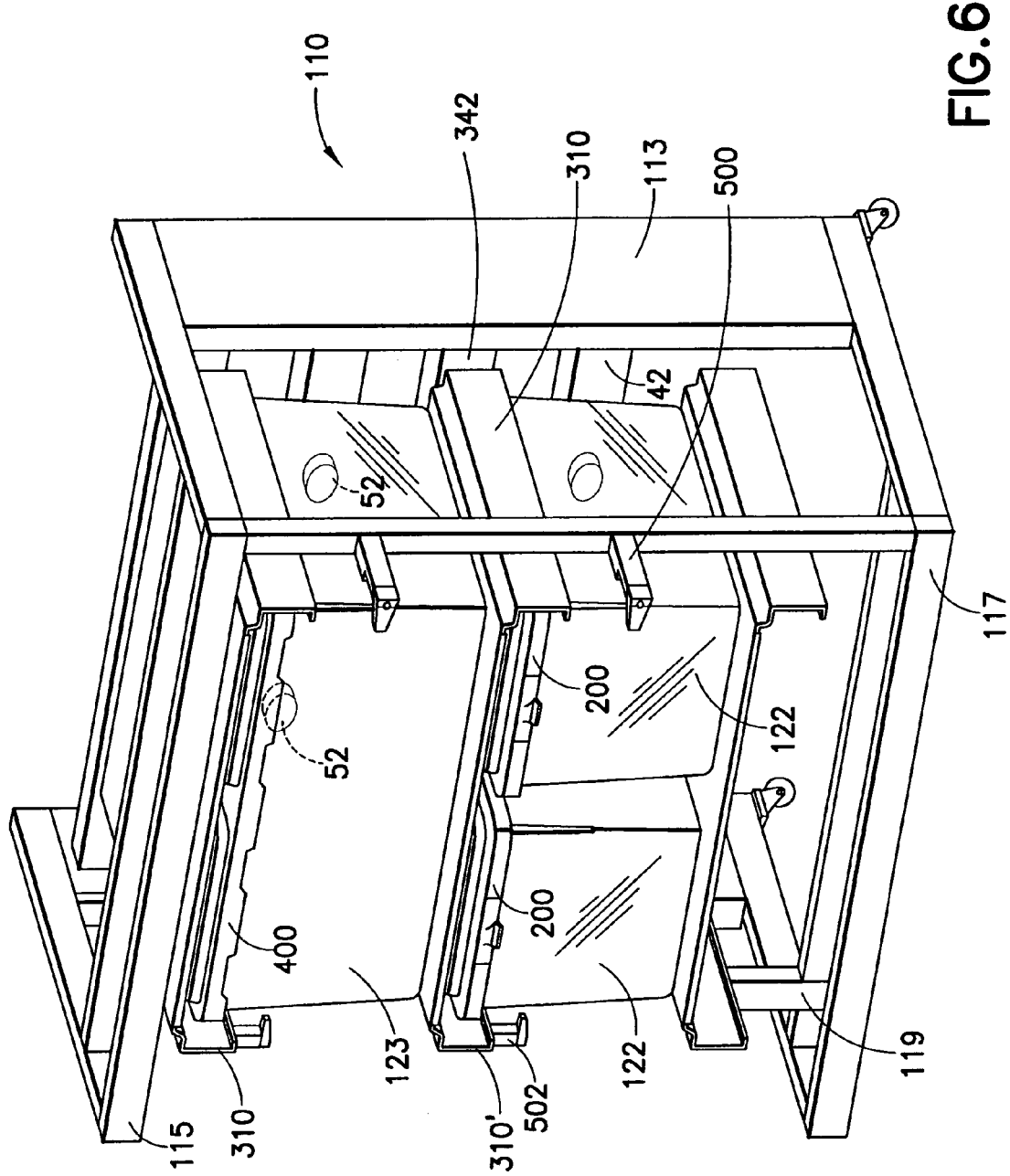
FIG. 6 is a perspective view of a ventilated cage and rack system in accordance with an embodiment of the invention wherein a first canopy is positioned over a single cage while a second canopy is positioned over two cages.

With reference to FIG. 6, there is shown a portion of an embodiment of the ventilated cage and rack system 110 of the invention. Cage and rack system 110 has right side wall 113, bottom wall 117 and a top wall 115 (for sake of clarity, a small rack, or a portion of a larger rack, is shown). Also, only a small portion of vertical post 119 is shown.

In accordance with an embodiment of the invention, a canopy 310 is disposed in a vertical array in cage and rack system 110. Importantly, a cage assembly comprising a single wide cage 123 is disposed below a first canopy 310, while a cage assembly comprising two narrower cages 122 is disposed below a second canopy 310' located directly below first canopy 310. In certain embodiments, both first canopy 310 and second canopy 310' are of the same design. In certain embodiments, narrow cage 122 may have a floor area of substantially 80 square inches, while wide cage 123 may have a floor area of substantially 210 square inches. In other embodiments, narrow cage 122 may have a floor area of substantially 75 square inches, while wide cage 123 may have a floor area of substantially 180 square inches.

As described above with respect an embodiment of a ventilated cage and rack system, air enters into the cages 123, 122 via air supply plena 340, and in turn cage coupling 52. Air is exhausted out of the bonnets 200 of cages 123, 122, under canopies 310 and 310', and into a duct 43 in air exhaust plena 342. As also described above, air also travels from the ambient room environment across the top of cage bonnet 200, and into air exhaust plena 342.

As described above, canopies 310, 310' are shaped and disposed such that the air leaving cages 123, 122 and the ambient room environment are advantageously channeled to exhaust plena 342. Importantly, both canopy 310 and canopy 310', which are of the same design, can facilitate an advantageous exhausting air flow whether a single wide cage 123, or two narrower cages 122 are disposed thereunder.

Additionally, cage 123 may be advantageously retained in position by cage lock 310, which engages with cage 123 at one side. In contrast, cages 122 may be retained in proper position in the rack by cage locks 500, 502.

Figure 7:
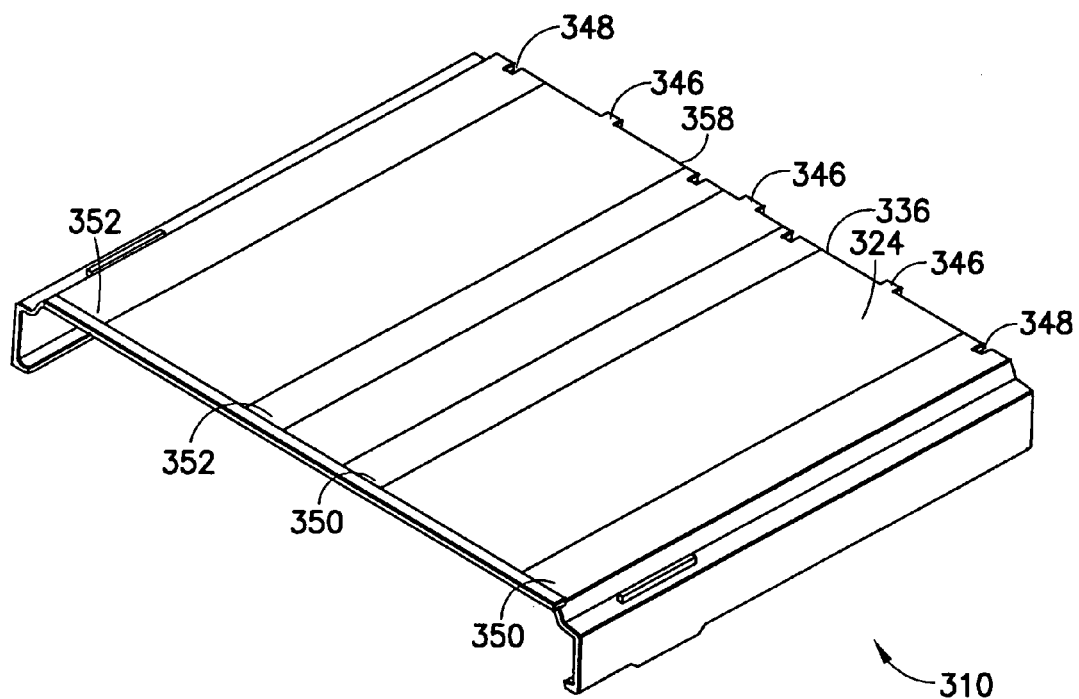
FIGS. 7 and 8 are top and bottom perspective views respectively of a canopy constructed in accordance with an embodiment of the invention.
Figure 8:
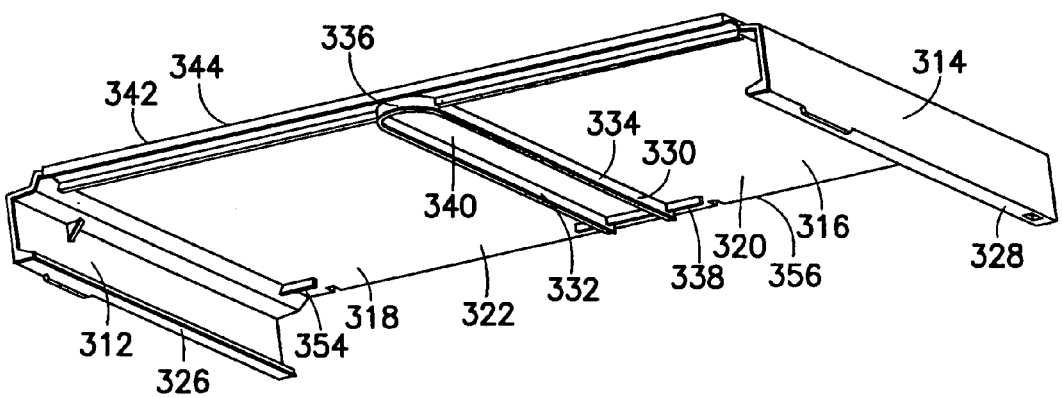
Figure 9:
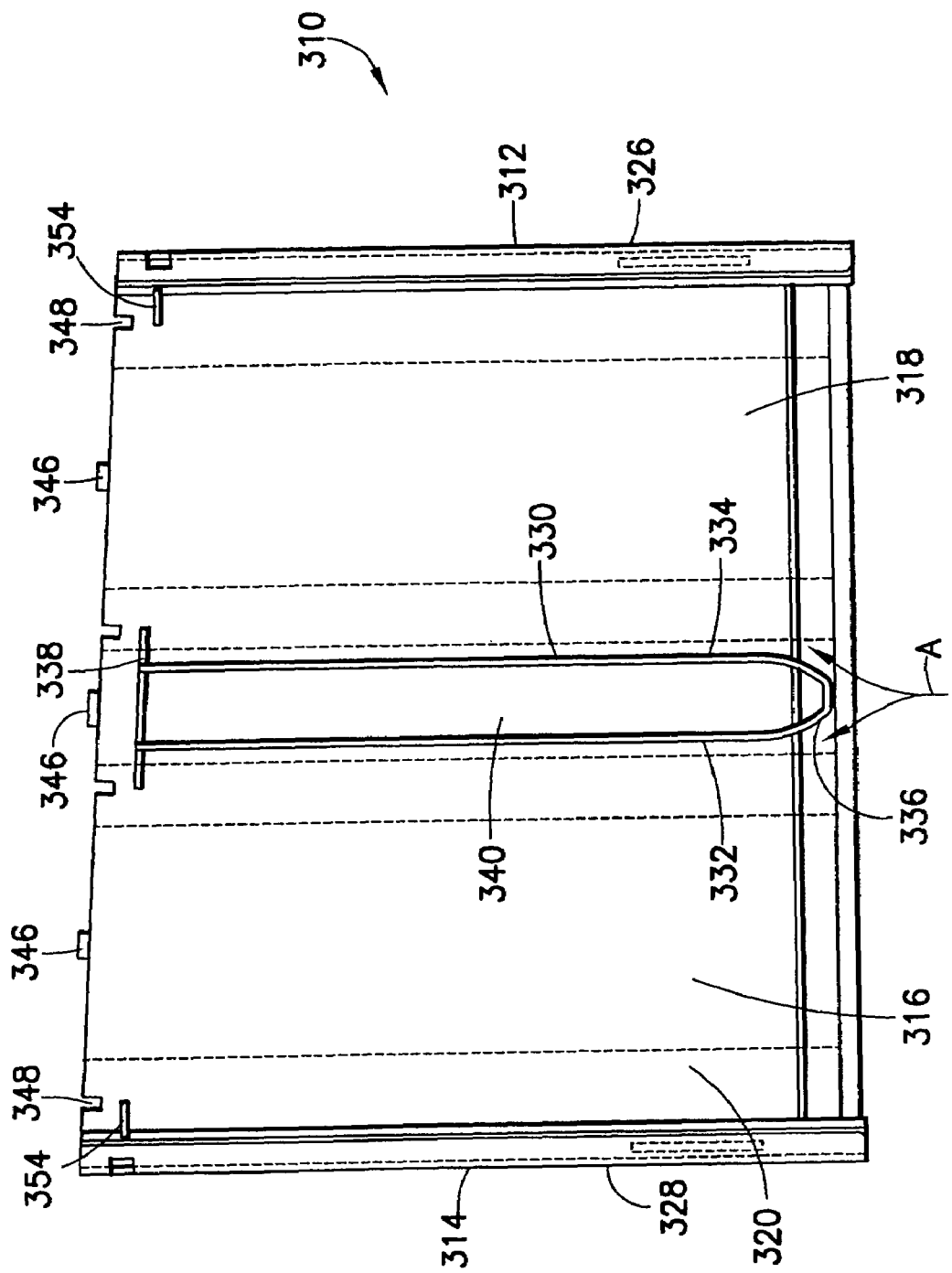
FIG. 9 is a bottom plan view of the canopy of FIGS. 7 and 8.
Figure 10:
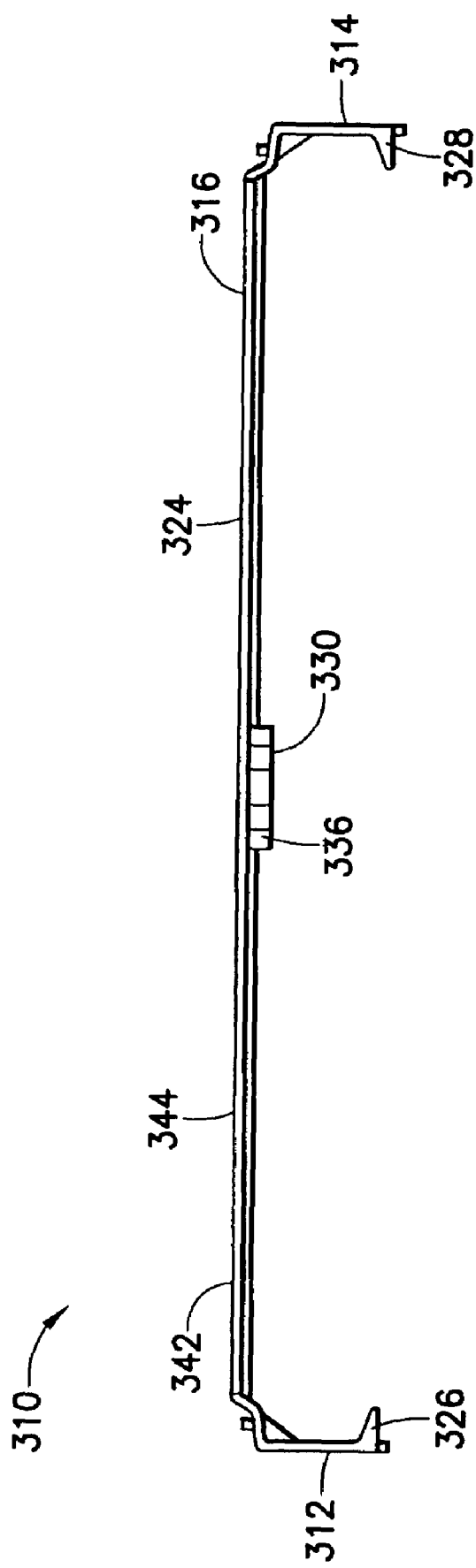
FIG. 10 is a front elevational view of the canopy of FIGS. 7 and 8.

Turning to FIGS. 8-10, and in particular FIGS. 7 and 8, canopy 310 is illustrated in greater detail. Canopy 310 may have top plate 316, and left and right side walls 312, 314 extending orthogonally away therefrom, at opposing edges of top plate 316. Lips 326, 328 extend orthogonally from side walls 312, 314 respectively and in a direction substantially parallel to top plate 316. Canopy 310 may also have channeling element 330 for channeling air away from a region bounded by right channel wall 334 and left channel wall 332 of channeling element 330.

Canopy 310 may be secured or attached to air exhaust plena 42 of rack 12 by way of tabs 346 and slots 348 defined in top plate 316. Tabs 346 are designed and dimensioned to fit into corresponding slots defined in rack 12 (not shown), preferably in air exist plena 42. Likewise, slots 348 of top plate 316 are designed and dimensioned to mate with corresponding structures (not shown) on rack 12. Accordingly, tabs 346 and slots 348 facilitate the securing of canopy 310 to rack 12, in a manner that is known to those skilled in the art.

A reinforcement member 344 may be disposed on front edge 342 of canopy 310. In an embodiment of the invention, reinforcement member 344 may be formed of metal or relatively rigid material to increase the overall bending rigidity of top plate 316 such that canopy 310 may support the weight of a wide cage 123, or two narrow cages 122. Reinforcement member 344 may be formed as an elongated U shape to snugly fit about front edge 342 and provide bending support to top plate 316.

Positioning recesses 350, 352 may be defined in top plate 316 and extend in a substantially parallel manner from front edge 342 to a rear edge 358 of upper surface 324 of top plate 316. Positioning recesses 350, 352 facilitate the sliding placement into and removal from rack 12 of either a wide cage 123 or two narrow cages 122 on top of canopy 310.

With reference to FIG. 9, (and continued reference to FIGS. 1 and 6) channeling element 330, rear channel wall 338 and flow tabs 354 are discussed in more detail. As is discussed above, the invention advantageously controls air flow into and out of cages 122, 123 such that the environments of individual cages as well as that of the ambient room environment may be satisfactorily isolated from each other. To achieve this goal, certain optimum air flow characteristics can be determined for animal cages, based upon the size of the cage, as a matter of application specific design choice.

As will be described in more detail below, canopy 310 also has rear channel wall 338 and flow tabs 354 extending down from lower surface 322 of top plate 316 of canopy 310. Rear channel wall 338 and flow tabs 354 work in conjunction with channeling element 330 to facilitate proper air flow from and about cage 20.

When two narrow cages 122 are used with a single canopy 310', air is pulled from the room toward air exhaust conduit 50, the air passed through the space above cage bonnet 200 of cage 122, and canopy 310'. With reference to FIG. 9, channeling element 330 facilitates the flow of ambient room air in direction H. Channeling element 330 may also facilitate the positioning of the cages 122 within the rack. In an embodiment of the invention, channeling element 330 preferably has a curved or rounded front channel wall 336 attached to left and right channel walls 332, 334 to facilitate smooth air flow about channeling element 330. Channel walls 332, 334 are designed and dimensioned to align with the opposed edges of continuous flange 230 of filter top bonnets 200 of the two adjacent cages. Without the use of channeling element 330, air would flow into center channel area 340 between channel walls 332, 334. If air were permitted to flow in this region, proper air flow from the cages 122 might not be maintained as some air would not be channeled across the cage 122, but would tend to flow in other directions. Additionally, additional vacuum pressure would be required to create the desired air flow characteristics. In addition, flow tabs 354 and rear channel wall 338 are likewise designed and dimensioned to align with respective portions of continuous flange 230 of bonnet 200, and facilitate proper air flow by serving to channel air from the room and cages 122 to air exhaust conduit 50. As can be seen with reference to FIG. 10, lips 326, 328 of canopy 310' also may facilitate proper air flow as portions of the air flow that might otherwise escape from under canopy 310' are directed back under the canopy 310'.

Figure 11:
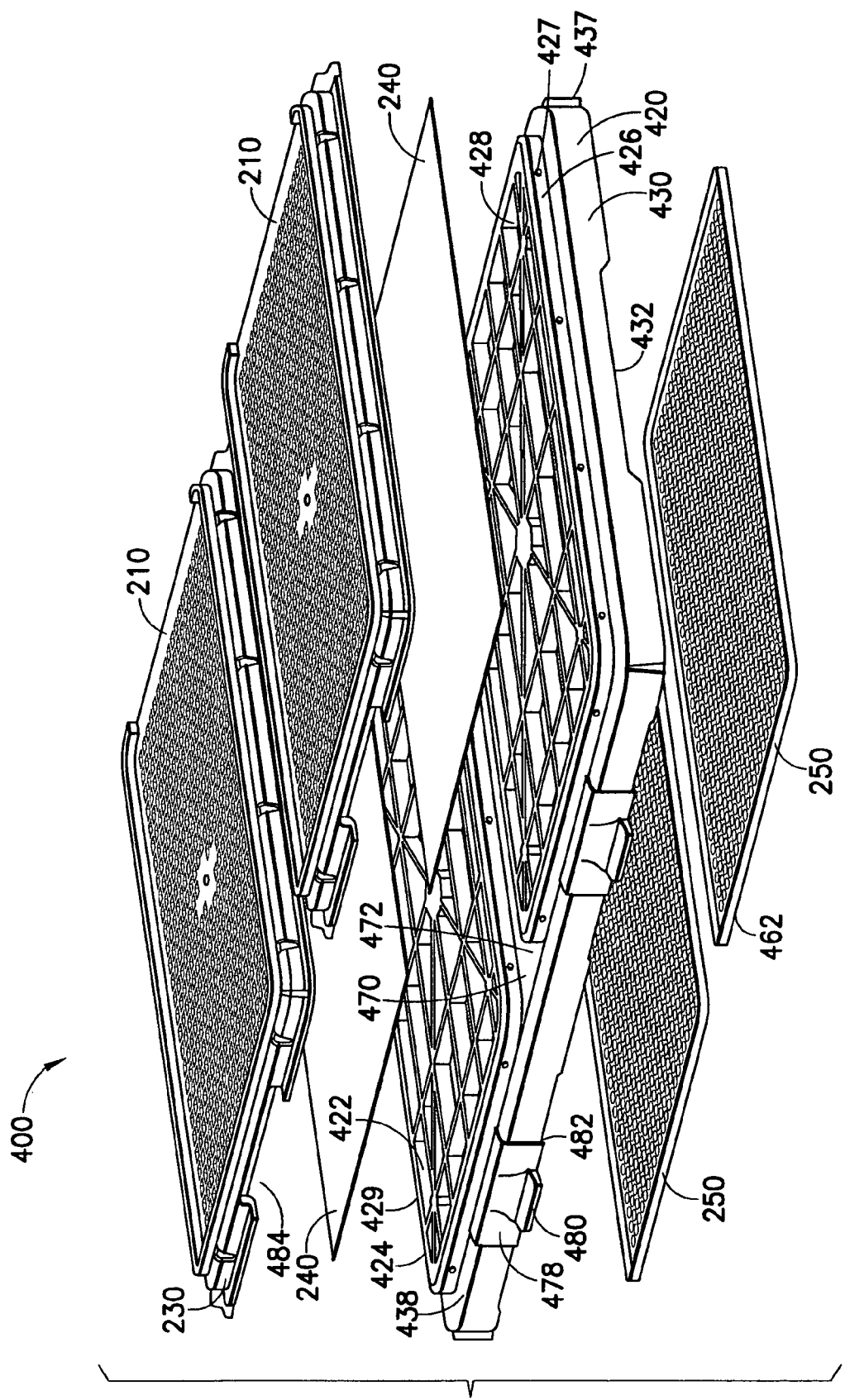
FIG. 11 is an exploded perspective view of a cage bonnet constructed in accordance with an embodiment of the invention.

With reference to FIG. 11-15C, and specifically to FIGS. 11-12B, there is shown an embodiment of a cage bonnet 400 constructed in accordance with the present invention. Cage bonnet 400 is similar in form and function to that of cage bonnet 200 described above (see FIG. 5), with a difference being that cage bonnet 400 is designed and dimensioned to be used with a wide cage 123 and bonnet 200 is designed and dimensioned to be used with a narrow cage 122 (see FIG. 6). Additionally, as may be seen with reference to FIG. 11, bonnet 400 has a top 420 having two flow portions 428, 429 at top wall 422. Flow portions 428, 429 are separated by channel 470, which is defined between and adjacent to flow portions 428, 429 on top wall 422 of top 420. In an embodiment of the invention, each flow portion 428, 429 of top 430 may be designed and dimensioned to accept retainers 210, filters 240, and filter shields 250 of the same size and dimension as that of cage 123 as described above, a difference being that top 420 is designed and dimensioned to receive two each of these components, while, as described above, each top 220 of cage 122 is only designed and dimensioned to receive one each of these components. A beneficial result of this embodiment is that many of the same components (e.g., retainers 210, filters 240 and filter shields 250) may be used within the system for both narrow cages 122 and wide cages 123, thus allowing personnel to reduce storage space for components. Additionally, as described above, a beneficial and consistent air flow dynamic may be achieved with the use of either two narrow cages 122, or a single wide cage 123 under a single canopy 310.

Top 420 may have a pair of securing latches 478 resiliently extending from the front of continuous flange 430 such that a handle 480 may be flexed away from top 420, retuning to its original position upon release, and facilitating engagement of latching tab 482 upon the edge of cage 123. Top 420 may also have perforations 424 within top wall 422, as shown, or relatively smaller perforations as is shown with respect to top 220 (see FIG. 5).

Figure 13A:
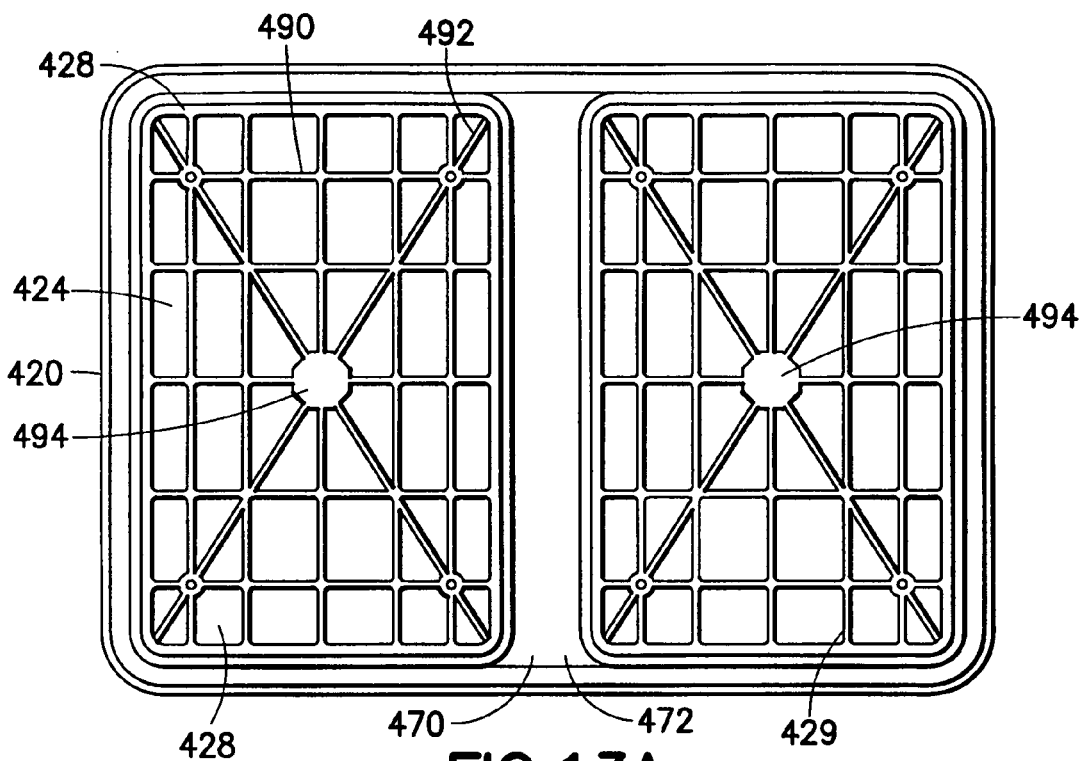
FIGS. 13A, 13B and 13C are a top elevational, front plan and bottom elevational views respectively of the cage top of FIGS. 12A and 12B.
Figure 13B:
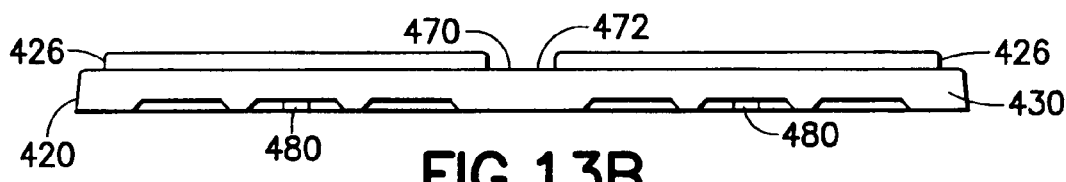
Figure 13C:
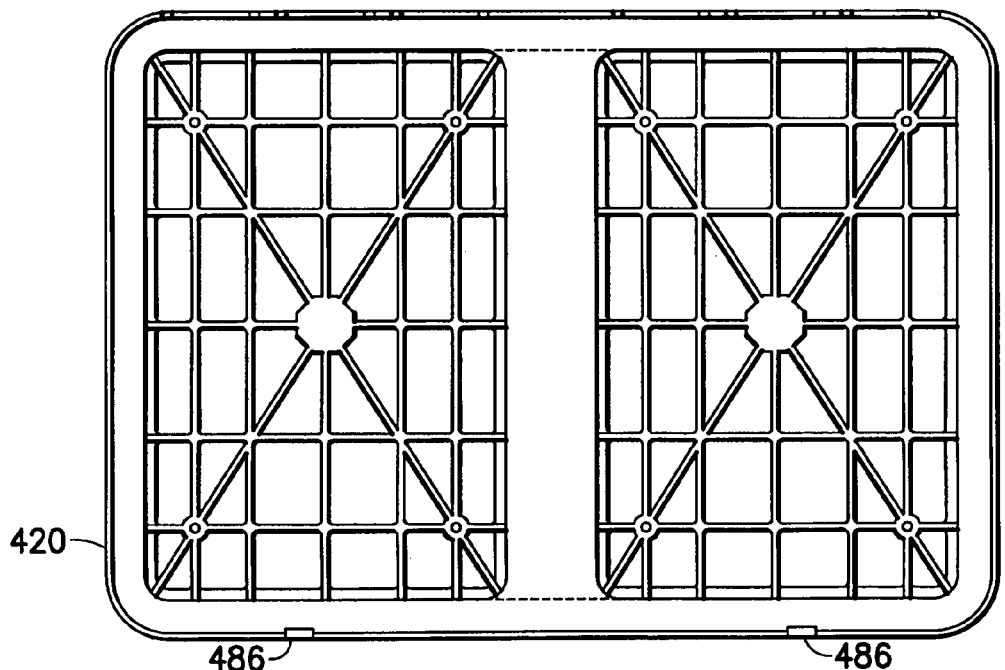
Figure 14A:
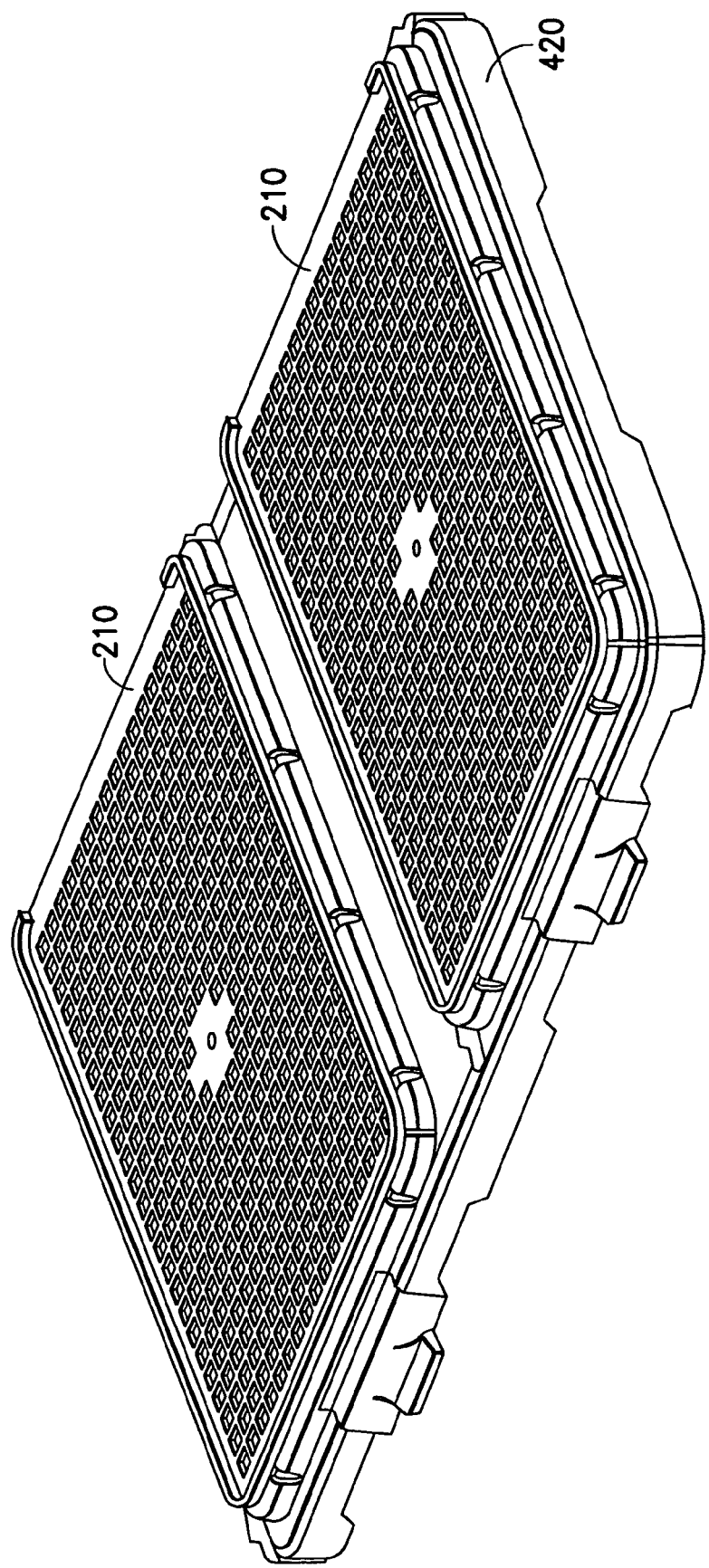
FIGS. 14A and 14B are top and bottom perspective views respectively of a cage top having two filter retainers and two filter shields positioned thereon in accordance with an embodiment of the invention.
Figure 14B:
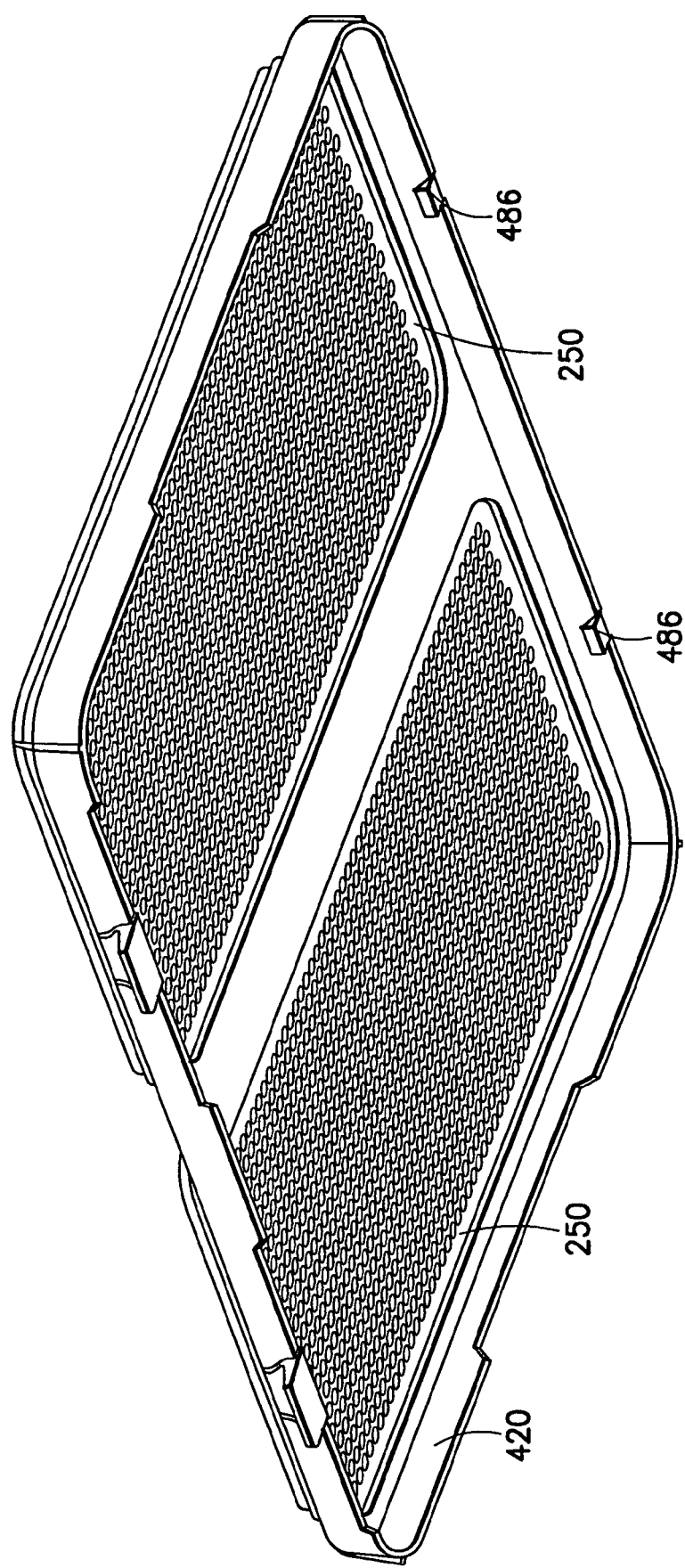
Figure 15A:
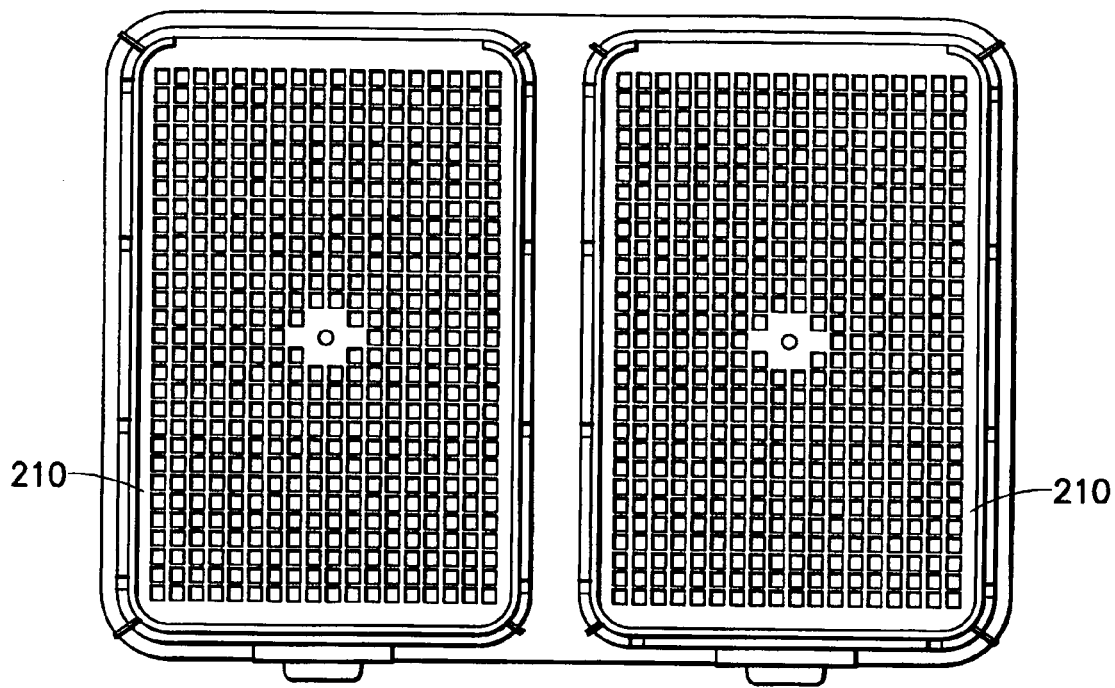
FIGS. 15A, 15B and 15C are a top elevational, front plan and bottom elevational views respectively of the cage top of FIGS. 14A and 14B.
Figure 15B:
Figure 15C:
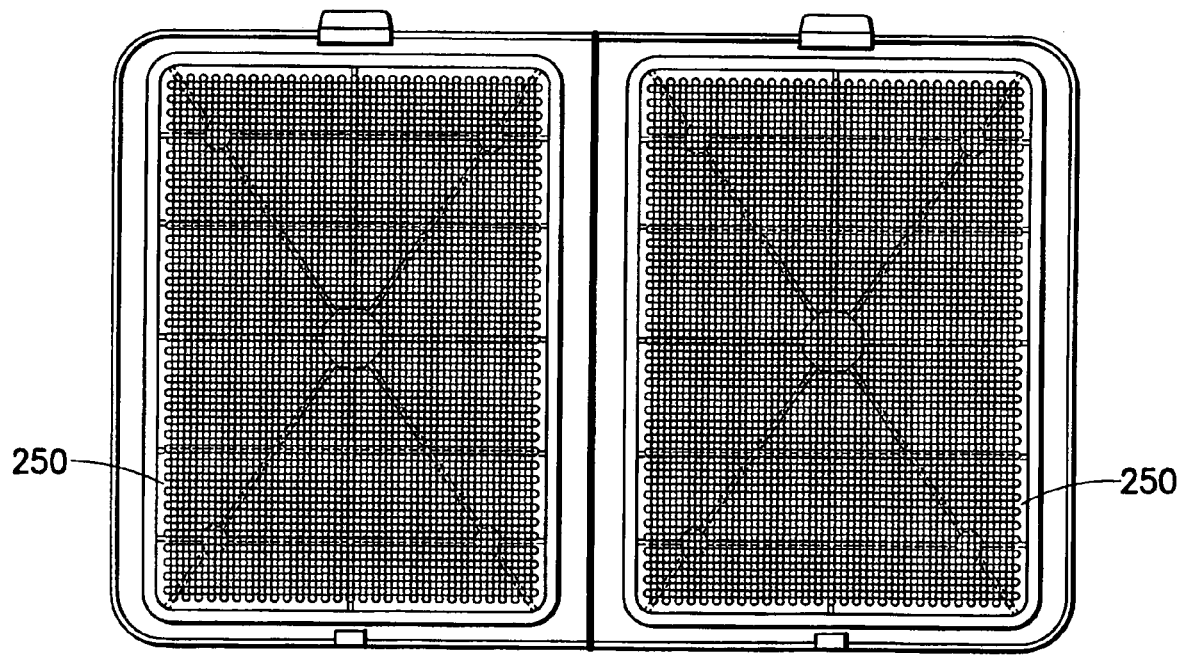

With reference to FIGS. 13A and 13B, the top wall 422 of top 420 may comprise a lattice of lateral supports 488 and cross members 490. Additionally, top wall 422 may have two pairs of diagonal members 492 extending diagonally between opposed corners of flow portions 428, 429, each pair connecting centrally at a hub portion 494. This arrangement of lateral supports 488, cross members 490 and hub portion 494 with perforations 424 formed therebetween provides for beneficial structural support of top 420 while allowing for a beneficial air flow through filters 240, as described above.

With reference to FIGS. 14A-15C, there is shown a top 420 of a cage bonnet 400 having two filter shields 250 retained thereunder by retention tabs 486. Two filter retainers 210 are disposed above top 420, with two filters 240 (not shown) sandwiched respectively therein.

Thus, a ventilated cage and rack system has been described having canopies that will facilitate placement of one wide cage, or two narrow cages under each canopy while still maintaining proper air flow into and out of the cages, as well as maintaining proper air flow from the ambient room environment over the top of the cages. By employing the invention, lab personnel may combine both wide and narrow cages within the same rack, thus saving time and space by not having to rely on two separate racks if the use of different sized cages is desired. Additionally, the cage tops for both the wide and narrow cages share many of the same components, thus reducing manufacturing costs and minimizing the need for storage space for components.

Figure 17:
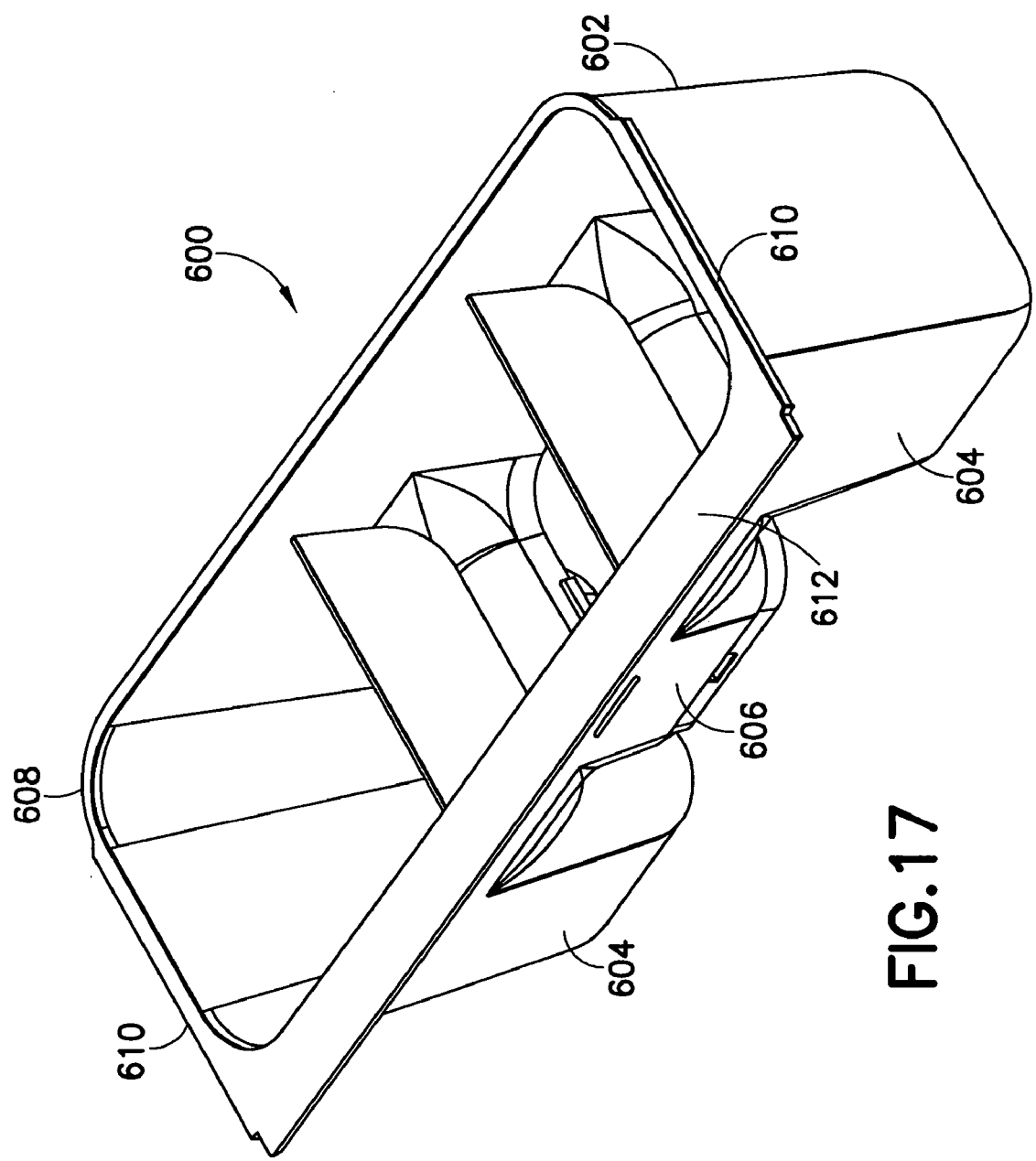
FIG. 17 is a perspective view of an embodiment of a diet delivery module in accordance with the invention.

With reference to FIG. 17, there is shown an embodiment of a diet delivery module 600 in accordance with the invention. Diet delivery module 600 is formed with body 602, preferably formed of a clear plastic that is autoclavable so that it can be sterilized or sanitized to provide a clean environment in which the animals can be maintained. Diet delivery module 600 is formed with two fluid compartments 604 at opposing sides of diet delivery module 600. Fluid compartments 604 can have rounded bottoms 605 that facilitate the flow of fluids to apertures 607. A sipper tube (not shown) or other fluid dispensing device may be disposed within apertures 607 such that animals be access fluids disposed within fluid compartments 604. A food module 606 is disposed in the center of diet delivery module 600, between the fluid modules 604. Body 602 has an upper peripheral lip 608 and flanges 610 extending outward from peripheral lip 608 at opposing sides of diet delivery module 600. Diet delivery module 600 also has stabilizing flange 612 extending from peripheral lip 608 and extending in a longitudinal manner from one end flange 610 to the other end flange 610.

Figure 18:
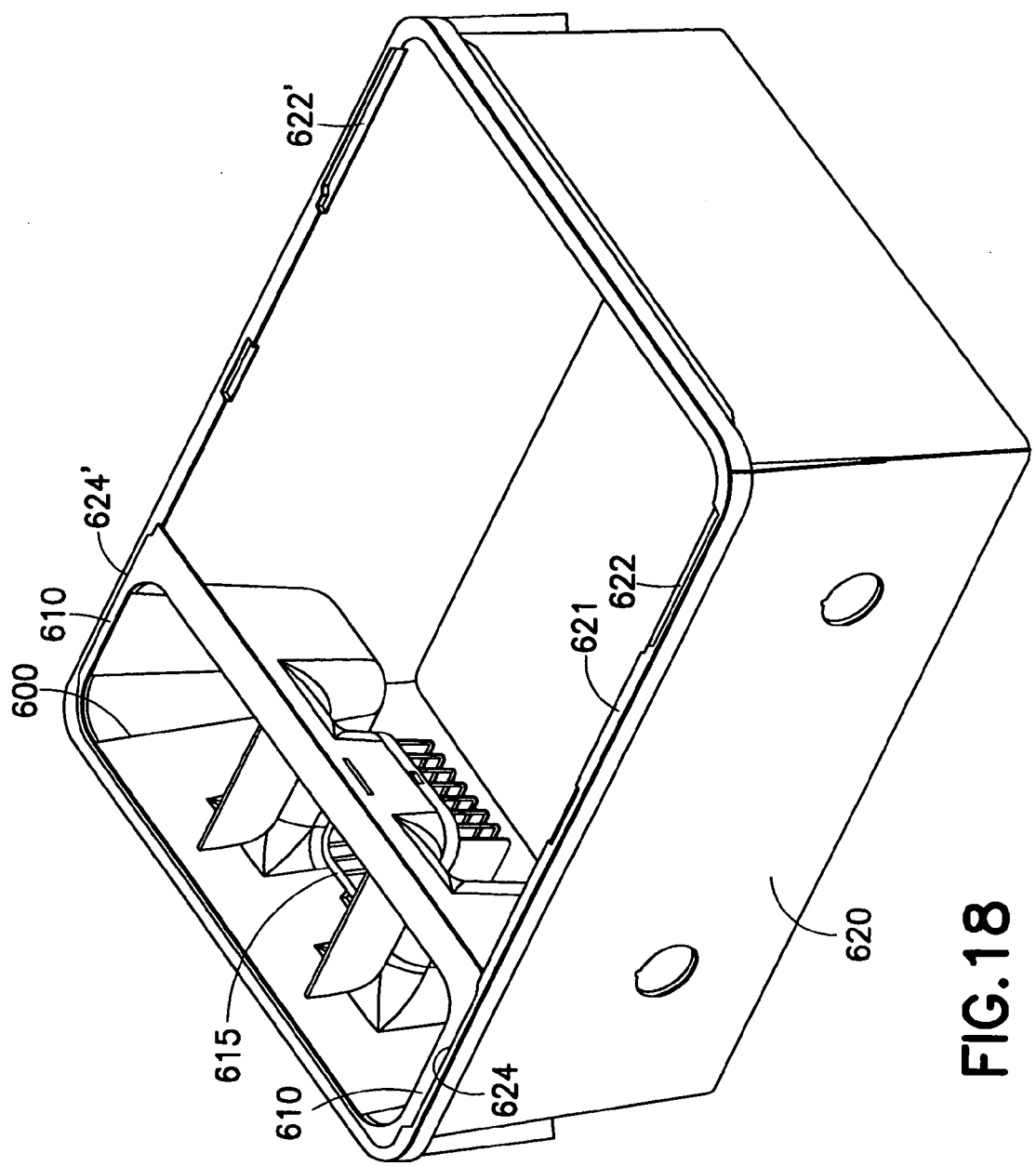
FIG. 18 is a perspective view of the diet delivery module of FIG. 17.
Figure 19:
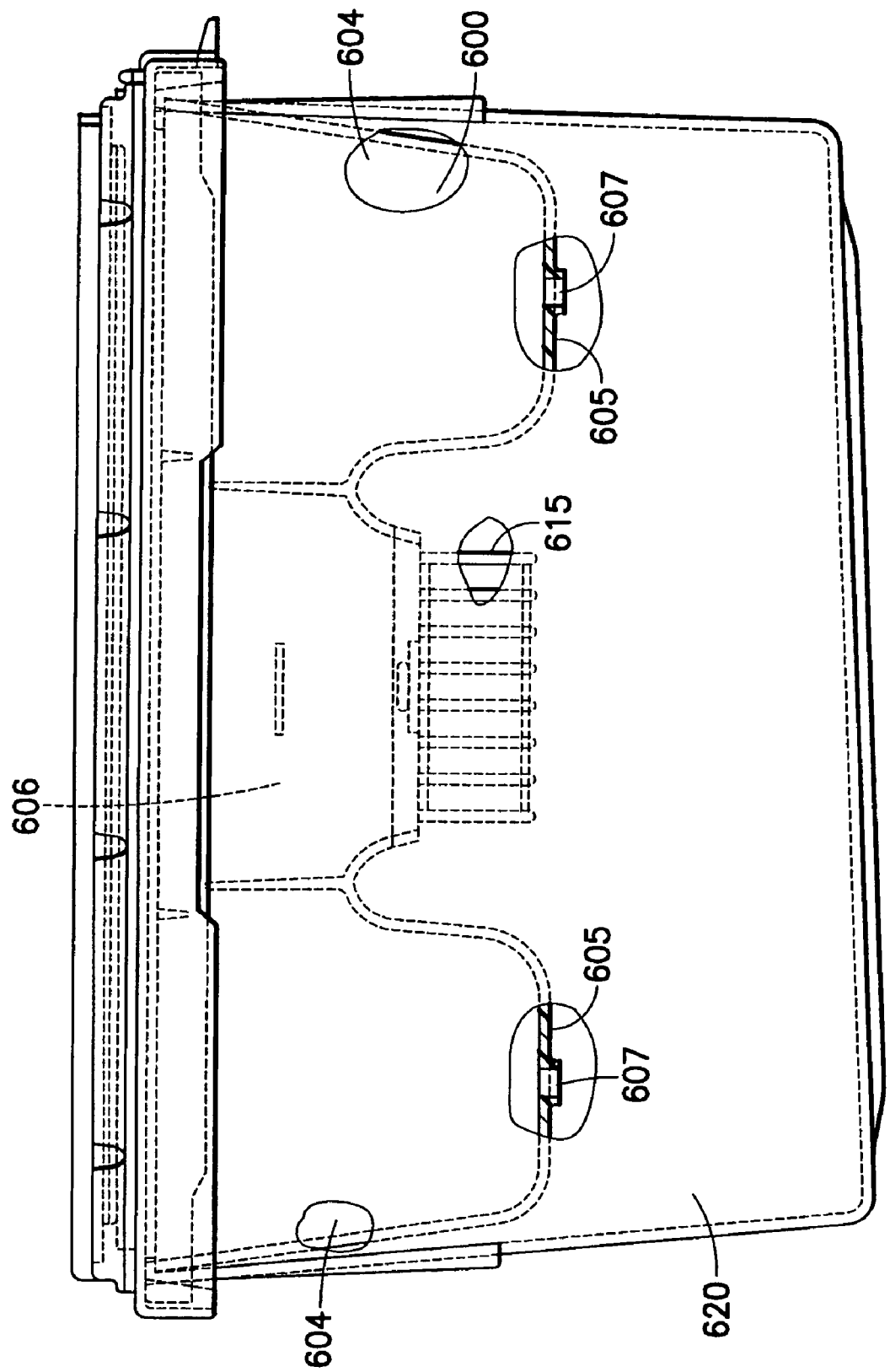
FIG. 19 is a side cross sectional view of the cage bottom and diet delivery module of FIG. 18.

An embodiment of a cage bottom 620 is illustrated in FIGS. 18 and 19. Recesses 622, 622', 624, 624' are defined in upper lip 621 of cage bottom 620. Diet delivery module 600 may be disposed in cage bottom 620 by aligning each of the flanges 610 of diet delivery module 600 in one of the recesses 624, 624' or 622, 622' of cage bottom 620.

Figure 20:
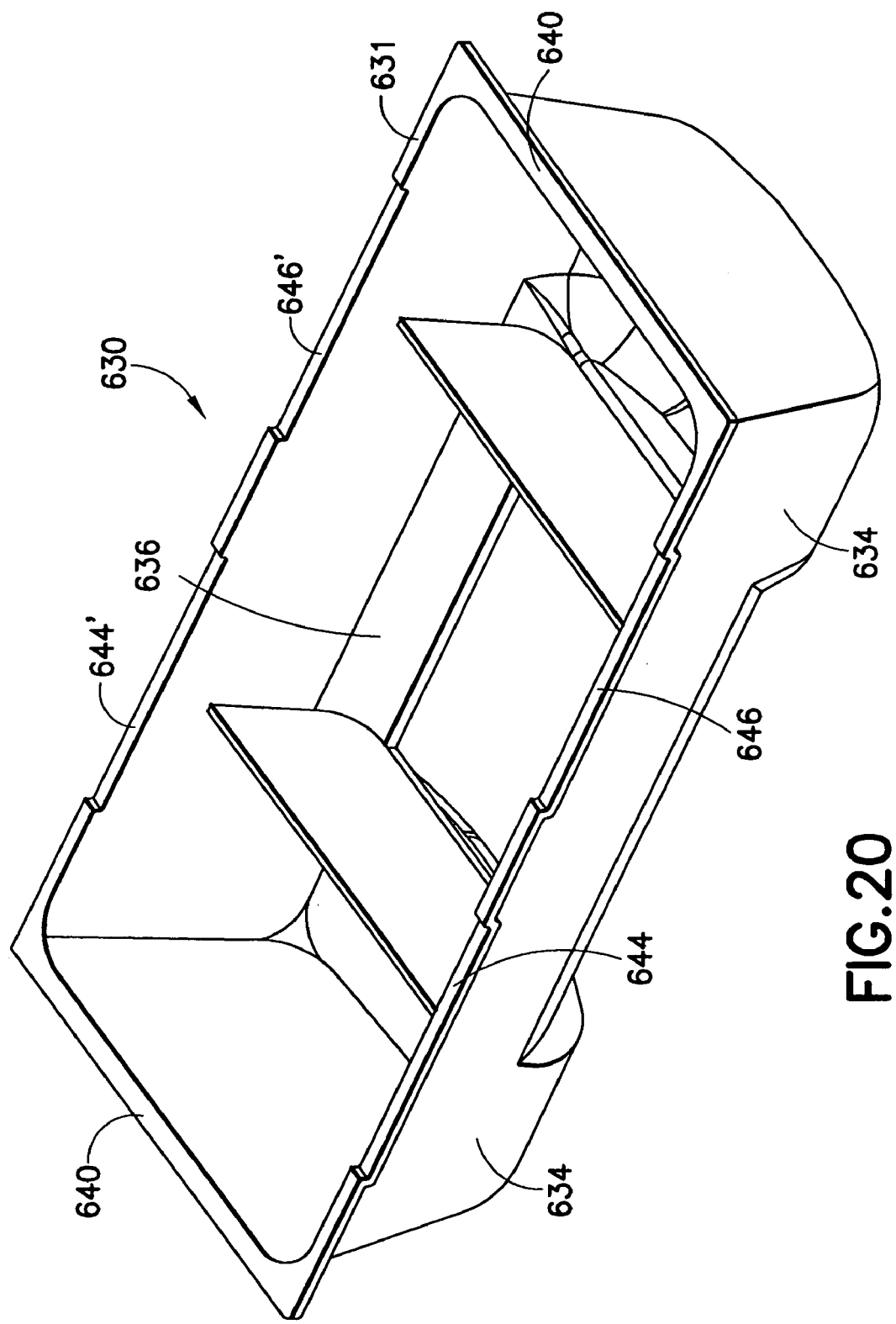
FIG. 20 is a perspective view of another embodiment of a diet delivery system in accordance with the invention.
Figure 21:
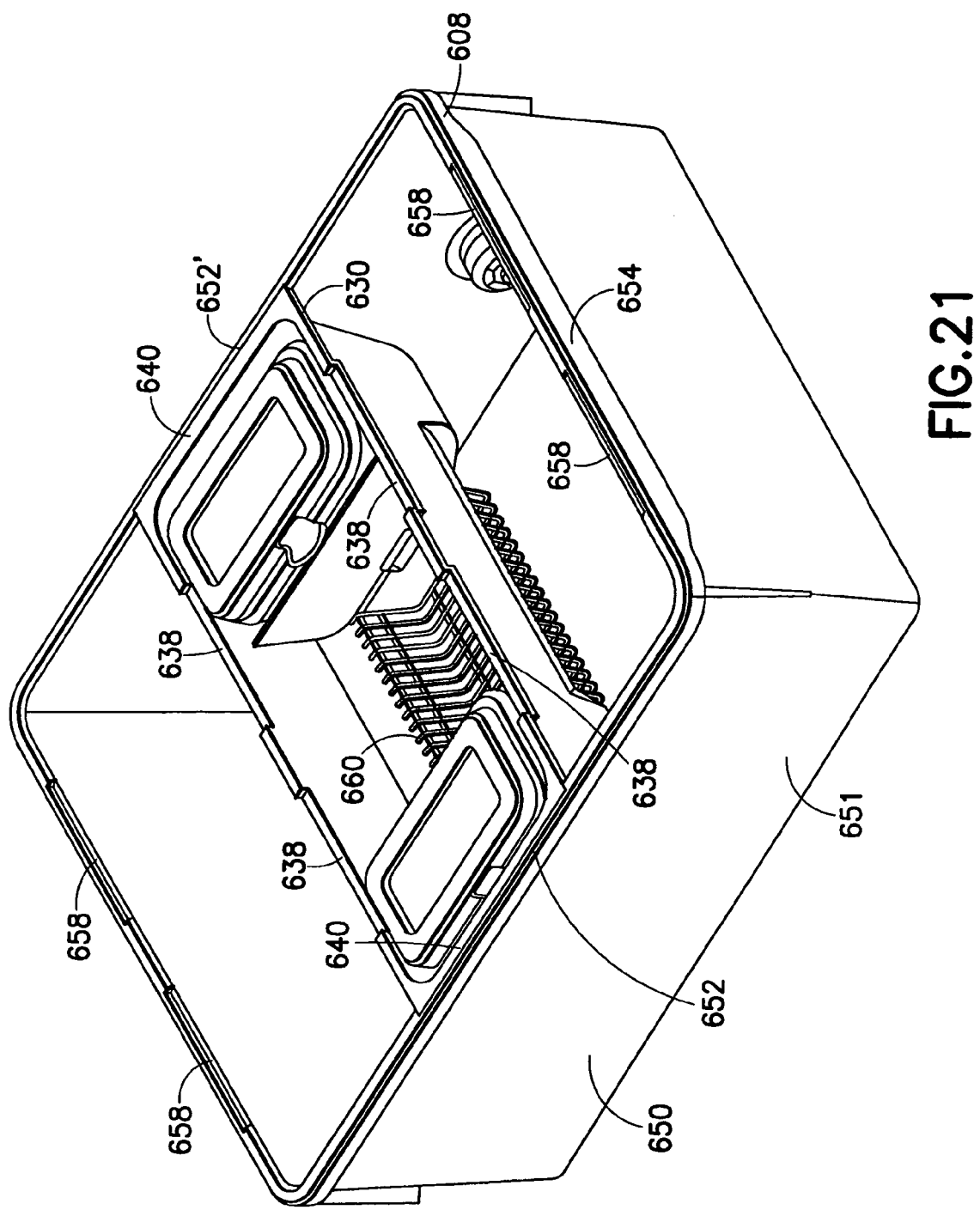
FIG. 21 is a perspective view of the diet delivery module of FIG. 20 disposed in another embodiment of a cage bottom in accordance with the invention.
Figure 22:
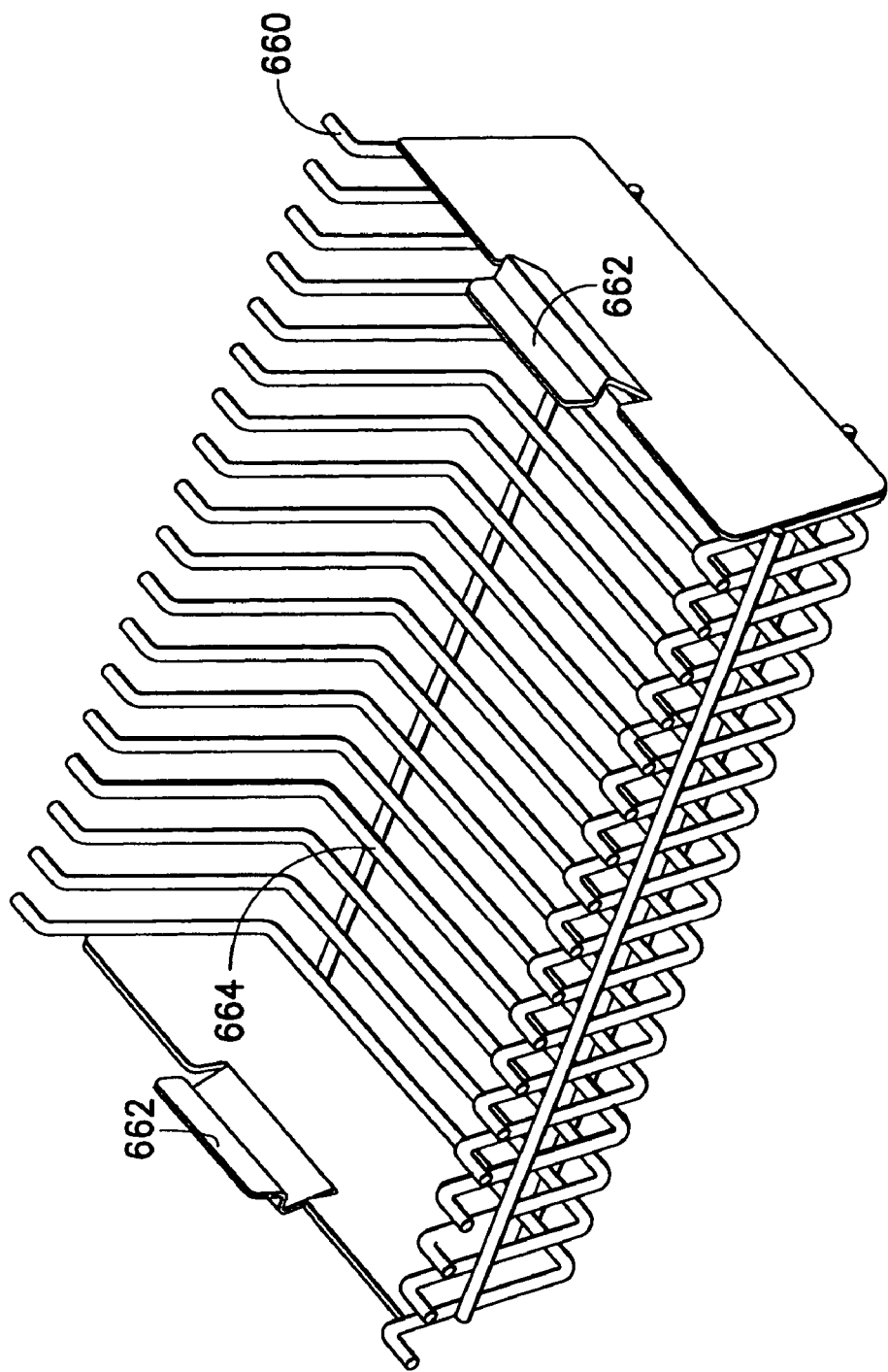
FIG. 22 is a perspective view of a wire bar feed module as disposed in the diet delivery module of FIG. 21.
Figure 23:
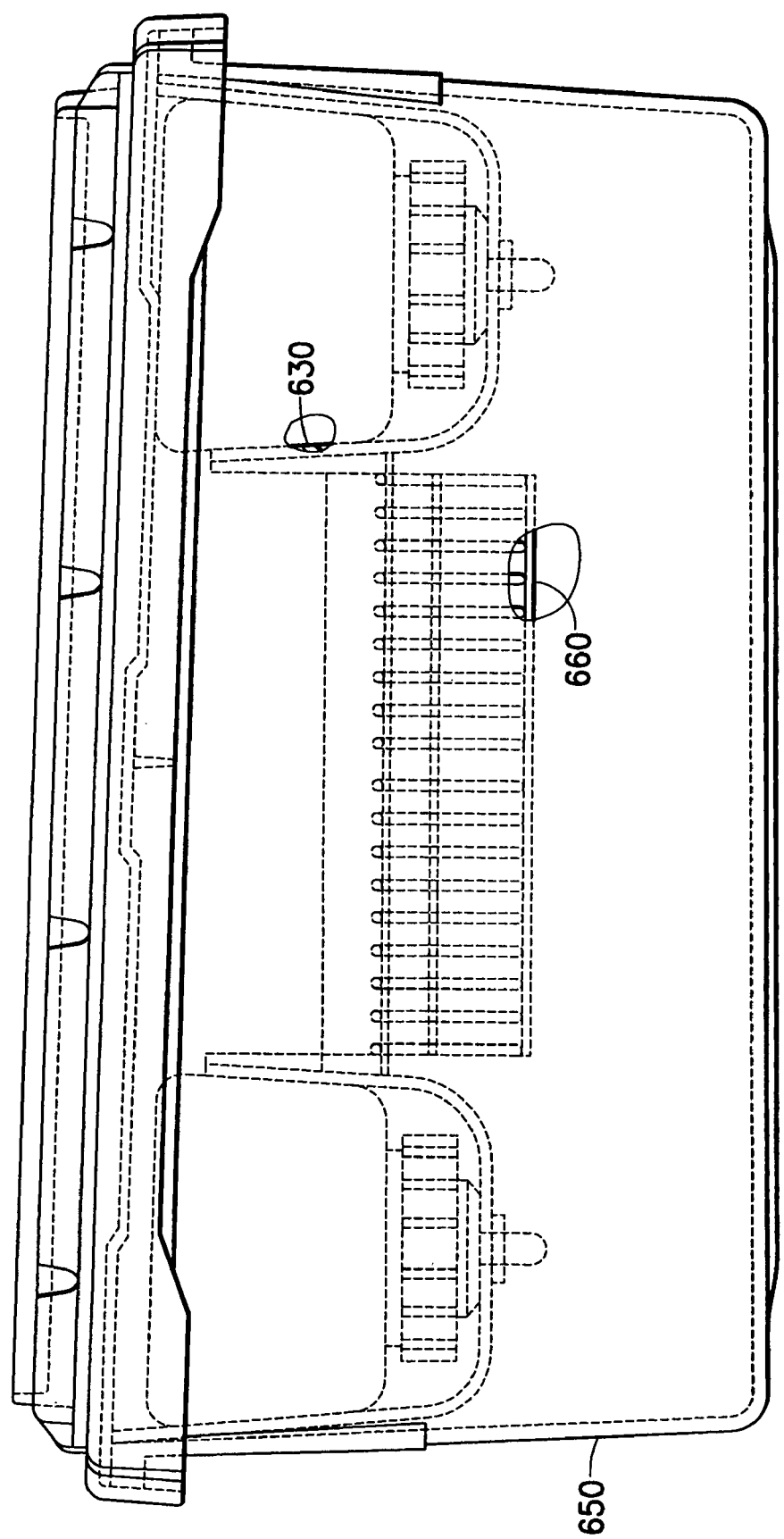
FIG. 23 is a side cross sectional view of the cage bottom, diet delivery module and wire bar feeder module of FIG. 21.
Figure 24:
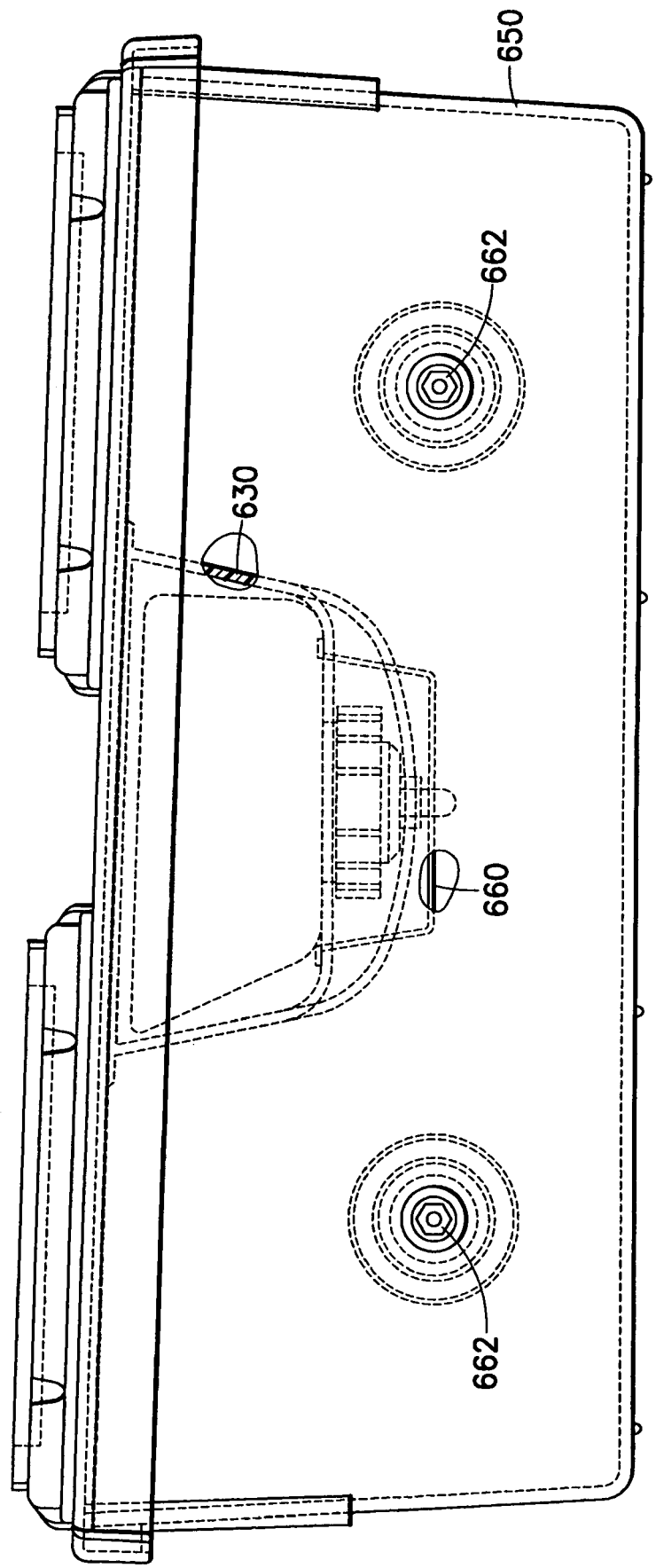
FIG. 24 is a front view of the cage bottom, diet delivery module and wire bar feeder module of FIG. 21.

With reference to FIG. 20, there is shown another embodiment of a diet delivery module 630. Diet delivery module 630 is similar to the previously described diet delivery module 600. Diet delivery module 630 comprises fluid modules 634 disposed at opposing ends of diet delivery module 630. Feed module 636 is disposed at a center of diet delivery module 630 between the opposing fluid delivery modules 634. Flanges 640 extend from the opposing ends of diet delivery module 630, extending from peripheral lip 631. Diet delivery module 630 also has recesses 644, 644' and 646, 646' defined in peripheral lip 631.

With reference to FIGS. 21-24, diet delivery module 630 may be disposed in cage bottom 650 by disposing the flanges 640 of diet delivery module 630 into the recesses 652, 652' defined in peripheral lip 651 of cage bottom 650. Wire food module 660 (see FIG. 22) may be disposed in feed module 636 of diet delivery module 630. Because, when diet delivery module 630 is disposed in cage bottom 650, diet delivery module 630 is positioned at a center of cage bottom 650, space is free in cage bottom 650 to the right and left of diet delivery module 630. This free space allows for easy, relatively unobstructed viewing of an animal within cage bottom 650. Also, when diet delivery module 630 is positioned at a center of cage bottom 650, gases entering cage bottom 650 through cage couplings 662 may enter without being obstructed by diet delivery module 650. Further, because diet delivery module 630 may be positioned at a center of cage bottom 650, additional modules with flanges adapted for use with the embodiment may be disposed in the pairs of recesses 658 and 638 defined in cage bottom 650 and diet delivery module 630 respectively. An example of such a module (or modules) that may be so positioned is an animal perch as is described in U.S. patent application Ser. No. 10/683,517, the contents of which are hereby incorporated by reference herein. Accordingly, a system has been shown which provides a flexible environment for positioning an array of modules along with a cage bottom and diet delivery module for an animal.

In certain embodiments, peripheral lib 608 of cage bottom 650 may have disposed thereon lifting extensions 654 disposed on peripheral lip 608 at opposing sides of cage bottom 650. The gripping recesses 432 of continuous flange 430 of cage bonnet 400 (see FIG. 11), preferably align with the lifting extensions 654 such that personnel may lift a cage bottom 650 having a bonnet 400 disposed thereon without displacing bonnet 400 from cage bottom 650. Accordingly, a cage bottom 650 and cage bonnet 400 combination may be lifted by personnel without breaching the seal between the two. In addition, secure lifting of the cage bottom 650 is facilitated, and consequently, accidental dropping of cage bottom 650 is made less likely.

What is claimed is:

1. A ventilated cage and rack system for housing at least one cage assembly, said system comprising:

a ventilated rack having a height, a width and a depth, wherein the rack is constructed and arranged to support a plurality of cages along the width of the rack, the rack including at least one air exhaust plenum running along the width of the rack; and at least one canopy supported by said rack, the canopy having a length and a width, the canopy being adapted to receive one or more cage assemblies below the canopy while maintaining a gap between the canopy and the top of said cage assembly so as to permit air to be drawn into the air exhaust plenum from the interior of said cage assembly through the top of said cage assembly and to also permit ambient air to be drawn across the top of said cage assembly into the air exhaust plenum;

wherein said cage assembly comprises at least one of a first cage having a first width at or about the width of the canopy or a plurality of second cages having at least a second width, said second width being less than said first width, wherein the combined widths of the second cages positioned side by side along the width of the canopy is at or about the width of the canopy;

wherein the canopy further comprises a centrally disposed channeling element having left and right channel walls extending downwardly from an interior surface of said canopy to facilitate said drawing of ambient air across said top of said cage assembly into the air exhaust plenum when said cage assembly comprises a plurality of said second cages, the canopy also including a front channel wall and a rear channel wall perpendicular and disposed in direct contact with the left and right channels walls and adapted to facilitate said drawing of ambient air across said top of said cage assembly into the air exhaust plenum when said cage assembly comprises a plurality of said second cages.

2. The ventilated cage and rack system of claim 1, wherein said plurality of second cages consists of two second cages.

3. The ventilated cage and rack system of claim 2, wherein said canopy comprises a channeling element adapted to facilitate said drawing of ambient air across said top of said cage assembly into the air exhaust plenum when said cage assembly consists of two cages.

4. The ventilated cage and rack system of claim 3, wherein said canopy further comprises a rear channel wall disposed adjacent said channeling element and adapted to facilitate said drawing of ambient air across said top of said cage assembly into the air exhaust plenum when said cage assembly consists of two second cages.

5. The ventilated cage and rack system of claim 4, wherein said canopy further comprises one or more flow tabs disposed at a rear edge of said canopy, said one or more flow tabs being adapted to facilitate said drawing of ambient air across said top of said cage assembly into the air exhaust plenum when said cage assembly consists of two cages.

6. The ventilated cage and rack system of claim 2, wherein each of said two second cages are secured within said ventilated rack by a corresponding cage lock, said cage locks being disposed on said ventilated rack such that said cage locks are disposed about non-adjacent sides of said cages.

7. The ventilated cage and rack system of claim 1, wherein said canopy further comprises one or more flow tabs disposed at a rear edge of said canopy, said one or more flow tabs being adapted to facilitate said drawing of ambient air across said top of said cage assembly into the air exhaust plenum when said cage assembly comprises a plurality of said second cages.

8. The ventilated cage and rack system of claim 1, wherein said canopy comprises a discrete reinforcement member disposed on a front edge of said canopy.

9. The ventilated cage and rack system of claim 1, wherein said canopy is attached to said air exhaust plenum and communicates with said air exhaust plenum through ducts in said air exhaust plenum.

10. The ventilated cage and rack system of claim 1, wherein said rack further comprises at least one air supply plenum and wherein said canopy positions said cage assembly to receive air from said air supply plenum.

11. The ventilated cage and rack system of claim 1, wherein said canopy further comprises a top plate, a left side wall and a right side wall.

12. The ventilated cage and rack system of claim 11, wherein the top and side plates are of substantially the same length as the length of said cage assembly in the rack.

13. The ventilated cage and rack system of claim 11, wherein each of said side walls is substantially perpendicular to the top plate.

14. The ventilated cage and rack system of claim 11, wherein said top plate and said left and right side walls are formed as a unitary member.

15. The ventilated cage and rack system of claim 11, wherein each said cage of said cage assembly further comprises a bottom portion with side walls and a filter cap, the filter cap having side walls which overhang the side walls of the bottom portion of the cage when the filter cap is mounted on the bottom portion, and wherein each of said left and right side walls of the canopy further comprise a lip extending perpendicularly from the side plate so that the lips extend underneath at least a portion of the overhanging side walls of the filter cap of the second cage.

16. The ventilated cage and rack system of claim 1, wherein said at least one canopy is substantially comprised of a transparent material.

17. The ventilated cage and rack system of claim 1, wherein said at least one canopy is substantially comprised of clear plastic.

18. A ventilated rack for housing cages having different widths, said system comprising:
a ventilated rack having a height, a width and a depth, wherein the rack is constructed and arranged to position a plurality of cages along the width of the rack, the rack including at least one air exhaust plenum running along the width of the rack; and
one or more canopies supported by said rack, the canopies having a length and width, at least one of said canopies being adapted to receive either one of a first cage or two of a second cage below the canopy so as to permit air to be drawn into the air exhaust plenum from the interior of each cage, the first cage having a first width at or about the width of the canopy, and the second cage having a second width, wherein the combined widths of two second cages positioned side by side along the width of the canopy is at or about the width of the canopy;
wherein said at least one of said canopies is adapted such that ambient air is drawn across the top of said cages into the air exhaust plenum, the at least one canopies further comprising a centrally disposed channeling element having left and right channel walls extending downwardly from an interior surface of said at least one canopy, said channeling element having a front channel wall and a rear channel wall perpendicular and disposed in direct contact with the left and right channel walls and adapted to facilitate said drawing of ambient air across said top of said cages.

19. The rack of claim 18, wherein said at least one of said canopies is adapted such that a gap is maintained between the top of the cages so as to permit air to be drawn into the air exhaust plenum from the interior of said cages.

20. The rack of claim 18, wherein said at least one of said canopies comprises a channeling element adapted to facilitate said drawing of ambient air across said top of said cages.

21. The rack of claim 18, wherein said at least one of said canopies further comprises one or more flow tabs disposed at a rear edge of said canopy, said one or more flow tabs being adapted to facilitate said drawing of ambient air across said top of said cages.

22. The rack of claim 18, wherein each of said cages are secured within said ventilated rack by a corresponding cage lock, said cage locks being disposed on said rack such that said cage locks are disposed about non-adjacent sides of said cages.

23. The rack of claim 18, wherein said at least one of said canopies comprises a discrete reinforcement member disposed on a front edge of said canopy.

24. The rack of claim 18, wherein said at least one of said canopies is attached to said air exhaust plenum and communicates with said air exhaust plenum through ducts in said air exhaust plenum.

25. The rack of claim 18, wherein said rack further comprises at least one air supply plenum and wherein said at least one of said canopies positions said cages to receive air from said air supply plenum.

26. The rack of claim 18, wherein said at least one of said canopies further comprises a top plate, a left side wall and a right side wall.

27. The rack of claim 26, wherein the top and side plates are of substantially the same length as the length of said cage assembly in the rack.

28. The rack of claim 26, wherein each of said side walls is substantially perpendicular to the top plate.

29. The rack of claim 26, wherein said top plate and said left and right side walls are formed as a unitary member.

30. The rack of claim 26, wherein each said cages further comprises a bottom portion with side walls and a filter cap, the filter cap having side walls which overhang the side walls of the bottom portion of the cage when the filter cap is mounted on the bottom portion, and wherein each of said left and right side walls of said at least one of said canopies further comprises a lip extending perpendicularly from the side plate so that the lips extend underneath at least a portion of the overhanging side walls of the filter cap of the cages.

31. The rack of claim 18, wherein said at least one canopy is substantially comprised of a transparent material.

32. The rack of claim 18, wherein said at least one canopy is substantially comprised of clear plastic.

33. A ventilated cage and rack system for housing at least one cage assembly, said system comprising:
   a ventilated rack having a height, a width and a depth, wherein the rack is constructed and arranged to support a plurality of canopies, the rack including at least one air exhaust plenum running along the width of the rack;
   a plurality of canopies supported by said rack, each canopy having a length and a width, the width being defined by at least two side plates, each canopy being adapted to receive one or more cage assemblies between the side plates below the canopy, such that a gap exists between the canopy and the top of said cage assembly so as to permit air to be drawn into the air exhaust plenum from the interior of said cage assembly through the top of said cage assembly and to also permit ambient air to be drawn across the top of said cage assembly into the air exhaust plenum;
   wherein said cage assembly comprises at least one of a first cage having a first width at or about the width of the canopy or a plurality of second cages having at least a second width, said second width being less than said first width, wherein the combined widths of the second cages positioned side by side along the width of the canopy is at or about the width of the canopy;
   wherein the plurality of canopies further comprising a centrally disposed channeling element having left and right channel walls extending downwardly from an interior surface of each canopy to facilitate said drawing of ambient air across said top of said cage assembly into the air exhaust plenum when said cage assembly comprises a plurality of said second cages, each canopy also including a front channel wall and a rear channel wall perpendicular and disposed in direct contact with the left and right channels walls and adapted to facilitate said drawing of ambient air across said top of said cage assembly into the air exhaust plenum when said cage assembly comprises a plurality of said second cages.

34. A ventilated cage and rack system for housing at least one cage assembly, said system comprising:
   a ventilated rack having a height, a width and a depth, wherein the rack is constructed and arranged to support a plurality of cages along the width of the rack, the rack including at least one air exhaust plenum running along the width of the rack; and
   at least one canopy supported by said rack, the canopy having a length and a width, the canopy being adapted to receive one or more cage assemblies below the canopy while maintaining a gap between the canopy and the top of said cage assembly so as to permit air to be drawn into the air exhaust plenum from the interior of said cage assembly through the top of said cage assembly and to also permit ambient air to be drawn across the top of said cage assembly into the air exhaust plenum;
   wherein said cage assembly comprises at least one of a first cage having a first width at or about the width of the canopy or two second cages having at least a second width, said second width being less than said first width, wherein the combined widths of the second cages positioned side by side along the width of the canopy is at or about the width of the canopy;
   wherein said canopy comprising a centrally disposed channeling element having left and right channel walls extending downwardly from an interior surface of said canopy to facilitate said drawing of ambient air across said top of said cage assembly into the air exhaust plenum when said cage assembly consists of two cages, the said canopy further comprising a front channel wall and a rear channel wall perpendicular and disposed in direct contact with the left and right channels walls and adapted to facilitate said drawing of ambient air across said top of said cage assembly into the air exhaust plenum when said cage assembly consists of two second cages.

35. The ventilated cage and rack system of claim 34, wherein said canopy further comprises one or more flow tabs disposed at a rear edge of said canopy, said one or more flow tabs being adapted to facilitate said drawing of ambient air across said top of said cage assembly into the air exhaust plenum when said cage assembly consists of two cages.

36. A ventilated rack for housing cages having different widths, said system comprising:
   a ventilated rack having a height, a width and a depth, wherein the rack is constructed and arranged to position a plurality of cages along the width of the rack, the rack including at least one air exhaust plenum running along the width of the rack; and
   one or more canopies supported by said rack, the canopies having a length and width, at least one of said canopies being adapted to receive either one of a first cage or two of a second cage below the canopy so as to permit air to be drawn into the air exhaust plenum from the interior of each cage, the first cage having a first width at or about the width of the canopy, and the second cage having a second width, wherein the combined widths of two second cages positioned side by side along the width of the canopy is at or about the width of the canopy;
   wherein said at least one of said canopies is adapted such that ambient air is drawn across the top of said cages into the air exhaust plenum, said at least one of said canopies further comprising one or more flow tabs disposed and extending downwardly from an interior surface of said canopy at a rear corner edge of said canopy, said one or more flow tabs being adapted to facilitate said drawing of ambient air across said top of said cages.

* * * * *